US012649178B2

(12) United States Patent
Yoder et al.

(10) Patent No.: US 12,649,178 B2
(45) Date of Patent: Jun. 9, 2026

(54) SOLID STATE MANUFACTURING TOOLS AND METHODS USING THEM

(71) Applicant: MELD MANUFACTURING CORPORATION, Christiansburg, VA (US)

(72) Inventors: Jake Yoder, Christiansburg, VA (US); Christian Birkett, Christiansburg, VA (US); Mandana Meisami Azad, Christiansburg, VA (US); John McGuire, Christiansburg, VA (US); Edward Colvin, Christiansburg, VA (US)

(73) Assignee: MELD MANUFACTURING CORPORATION, Christiansburg, VA (US)

( * ) Notice: Subject to any disclaimer, the term of this patent is extended or adjusted under 35 U.S.C. 154(b) by 0 days.

(21) Appl. No.: 19/060,449

(22) Filed: Feb. 21, 2025

(65) Prior Publication Data

US 2025/0229312 A1      Jul. 17, 2025

Related U.S. Application Data

(63) Continuation of application No. 18/980,513, filed on Dec. 13, 2024.

(60) Provisional application No. 63/610,349, filed on Dec. 14, 2023.

(51) Int. Cl.
*B21C 25/02* (2006.01)
*B33Y 10/00* (2015.01)
*B33Y 30/00* (2015.01)
*B21C 23/08* (2006.01)

(52) U.S. Cl.
CPC .............. *B21C 25/02* (2013.01); *B33Y 10/00* (2014.12); *B33Y 30/00* (2014.12); *B21C 23/08* (2013.01)

(58) Field of Classification Search
None
See application file for complete search history.

(56) References Cited

U.S. PATENT DOCUMENTS

| | | | | | |
|---|---|---|---|---|---|
| 6,457,629 | B1 * | 10/2002 | White | .................. | B23K 20/103 |
| | | | | | 228/114.5 |
| 6,543,671 | B2 * | 4/2003 | Hatten | ............... | B23K 20/1255 |
| | | | | | 228/2.1 |
| 7,654,435 | B2 * | 2/2010 | Kumagai | ........... | B23K 20/1265 |
| | | | | | 228/2.1 |
| 9,862,054 | B2 * | 1/2018 | Kandasamy | ....... | B23K 20/1245 |
| 10,092,975 | B2 * | 10/2018 | Twelves, Jr. | ....... | B23K 20/1215 |
| 2009/0200275 | A1 * | 8/2009 | Twelves, Jr. | ........... | B33Y 30/00 |
| | | | | | 427/591 |
| 2015/0183161 | A1 * | 7/2015 | Molinari | ............... | B29C 64/118 |
| | | | | | 425/375 |
| 2017/0106601 | A1 | 4/2017 | Page | | |

(Continued)

OTHER PUBLICATIONS

ISR/WO for PCT/US24/60069 mailed on Feb. 13, 2025.

*Primary Examiner* — Devang R Patel
(74) *Attorney, Agent, or Firm* — Rhodes IP PLC; Christopher R Rhodes

(57) ABSTRACT

Tools for use in solid state manufacturing processes are described. Certain configurations of the tool include multiple different components that can reversibly couple to each other. The tools can be used in solid state manufacturing processes to deposit high strength alloy materials without the need to use a lubricant with the materials to be deposited.

20 Claims, 21 Drawing Sheets

(56)                    References Cited

U.S. PATENT DOCUMENTS

| | | | |
|---|---|---|---|
| 2018/0001548 A1 | 1/2018 | Dietrich et al. | |
| 2020/0306869 A1* | 10/2020 | Hardwick | B23K 20/1215 |
| 2020/0331203 A1* | 10/2020 | Verma | B29C 64/209 |
| 2021/0053283 A1 | 2/2021 | Liu et al. | |
| 2021/0245293 A1 | 8/2021 | Hardwick et al. | |
| 2021/0252632 A1 | 8/2021 | Eller et al. | |
| 2022/0080522 A1* | 3/2022 | Cox | B23K 26/352 |
| 2022/0140268 A1 | 5/2022 | So et al. | |
| 2023/0146110 A1* | 5/2023 | Allison | B33Y 30/00 |
| | | | 228/112.1 |

* cited by examiner

220

310

310

410

1300

1102

1152

1302 1304

1400

1402

1452

1462

1502

1592

1552

1602        1606

1604        1608

3010

3050

3020

3030

3020

3030

3034

3032

Build #1

SOLID STATE MANUFACTURING TOOLS AND METHODS USING THEM

TECHNOLOGICAL FIELD

Certain configurations of tools that can be used in solid state manufacturing processes and systems are described. In some configurations, the tool can be a multi-component tool used in lubricant free solid state manufacturing applications.

BACKGROUND

Metal parts are often produced using forging or extrusion processes. Forging and extrusion processes often require the use of expensive components to shape or produce the metal parts.

SUMMARY

In an aspect, a tool for depositing solid state material using a solid state manufacturing process is described. In certain configurations, the tool comprises a first member comprising an first inlet, a first outlet, and a first channel between the first inlet and the first outlet, wherein the first inlet is configured to receive a solid feedstock material. The tool can also include a second member comprising a second inlet, a second outlet, and a second channel between the second inlet and the second outlet, the second member configured to reversibly couple to the first member to permit solid feedstock material to be provided from the first member to the second member through the first channel and the first outlet of the first member into the second inlet and the second channel of the second member, wherein the second channel of the second member comprises a draft angle at the second outlet of the second member to permit deposition of the solid feedstock material from the second outlet onto a surface without using any lubricant on the solid feedstock material.

In certain embodiments, the first member and the second member each comprises a material with a thermal conductivity of at least 125 W/m-K. In some embodiments, the first member and the second member comprises at least one material that is the same. In other embodiments, the first member comprises a material that is different than a material of the second member. In additional embodiments, the tool comprises a gasket between the first member and the second member, wherein the gasket is configured to provide a thermal break between the first member and the second member. In some configurations, the first member comprises a first coupler that couples the first member to the second member to retain the second member to the first member during use of the tool to deposit the solid feedstock material onto the surface. In other embodiments, the tool comprises a second coupler on the second member.

In some embodiments, a cross-sectional shape of the first channel of the first member and a cross-sectional shape of the second channel of the second member are the same. In other embodiments, a cross-sectional shape of at least a portion of the first channel of the first member and a cross-sectional shape of the second channel of the second member are different. In certain embodiments, a diameter of the second channel at the second outlet of the second member is greater than a diameter of the first channel at the first outlet of the first member. In other embodiments, a diameter of the second channel at the second outlet of the second member is greater than a diameter of the second channel at the second inlet of the second member.

In some configurations, at least one of the first member and the second member comprises an internal channel. In other embodiments, each of the first member and the second member comprises an internal channel, and wherein the internal channel of the first member is coupled to the internal channel of the second member when the first member is reversibly coupled to the second member.

In other configurations, the second member comprises at least one friction boss configured to generate friction between a face of the tool and the surface during rotation of the tool while depositing the solid feedstock material onto the surface.

In certain embodiments, the first outlet of the first member slidingly engages the second inlet of the second member when the first member is reversibly coupled to the second member. In other embodiments, the first outlet of the first member slidingly engages the second inlet of the second member when the first member is reversibly coupled to the second member.

In some embodiments, each of the first member and the second member comprises apertures configured to receive a mechanical fastener to couple the first member to the second member.

In other embodiments, an outer diameter of the first member at the first inlet is lower than an outer diameter of the first member at the first outlet. In some configurations, an outer diameter of the second member at the second inlet is lower than an outer diameter of the second member at the second outlet.

In certain embodiments, the tool comprises a third member comprising a third inlet, a third outlet, and a third channel between the third inlet and the third outlet, wherein the third member is configured to couple to the first member at the first inlet end of the first member to permit solid feedstock material in the third channel to be provided into the first inlet and the first channel.

In another aspect, a method of depositing a solid state feedstock material onto a surface using a solid state manufacturing system comprising a tool comprising a first member reversibly coupled to a second member is disclosed. For example, the method comprises applying a force to move solid feedstock material in a first channel of the first member into a second channel of the second member without using any lubricant on the solid feedstock material, and generating deformation of the solid feedstock material using the tool to deposit the deformed solid feedstock material from the second member onto the surface without using any lubricant on the solid feedstock material during deposition.

In certain embodiments, the second tool member comprises at least one friction boss configured to contact the surface during deposition of the solid feedstock material onto the surface. In other embodiments, the second member comprises a draft angle adjacent to an end of the second member that contacts the surface during deposition of the solid feedstock material onto the surface.

In certain configurations, the first channel and the second channel comprise a square cross-sectional shape. In some embodiments, a diameter of at least a portion of the second channel is greater than a diameter of the first channel.

In some embodiments, deformation of the solid feedstock material comprises contacting a face of the second member of the tool with the surface and rotating the contacted second member while applying the force to the feedstock material during deposition of the solid feedstock material onto the surface.

In certain embodiments, the method comprises monitoring temperature of the second member during deposition of the solid feedstock material onto the surface.

In some embodiments, the method comprises removing the second member from the first member and coupling a different second member to the first member to provide a second tool configured to deposit the solid state feedstock material onto the substrate.

In other embodiments, the method comprises coupling a third member to the first member to provide a tool comprising the first member, the second member and the third member. In certain embodiments, at least one of the first member and the second member comprises an internal channel.

In another aspect, a tool for depositing solid state material, from elongated metallic and metal-based composite materials in the form of bars, rods, wires and other products, using a solid state manufacturing process with the feedstock material in constant, direct contact with the substrate and previously deposited material is described. For example, the tool comprises a tool member comprising an inlet, an outlet, and a channel between the inlet and the outlet, wherein the channel comprises a draft angle at the outlet to permit deposition of the solid feedstock material from the outlet and onto a surface without any lubricant on the solid feedstock material In certain embodiments, a face at the outlet comprises at least one friction boss configured to engage the surface and cause deformation of the solid feedstock material deposited at the surface.

In an additional aspect, a kit comprises a tool as described herein and instructions for using the tool in a solid state manufacturing process.

BRIEF DESCRIPTION OF THE SEVERAL VIEWS OF THE DRAWINGS

Certain aspects, configurations and embodiments are described with reference to the accompanying drawings in which.

DETAILED DESCRIPTION

Figure 1:
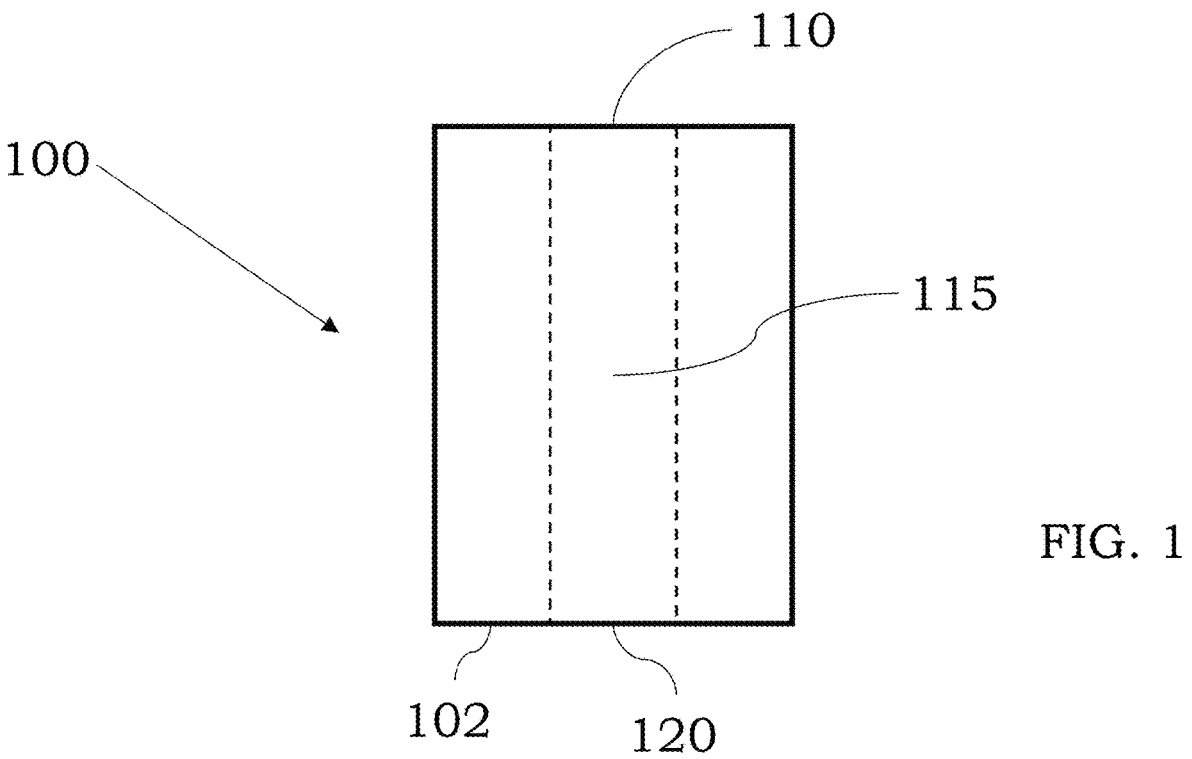
FIG. 1 is an illustration of a tool member.

Certain configurations of tools and methods are described that permit deposition of solid materials onto surfaces. The tool can be used to deposit materials onto a surface without the need for any lubricant on the solid feedstock material introduced into the tool. For example, a multi-member tool can be used to deposit high strength aluminum and magnesium alloys without needing to lubricate the solid feedstock material. The ability to deposit solid material without using a lubricant can provide several attributes including more consistent material performance, reduced cracking, lower number of internal voids, improved ductility, higher fatigue life and higher fracture toughness. These attributes are provided merely by way of example and all deposited solid materials may not necessarily have any or all of these attributes.

Solid state manufacturing (SSM) that deposits solid material can be used to deposit various solid materials onto surfaces. SSM includes several different types of processes including friction stir, friction welding, friction extrusion, solid state additive processes and other processes where a solid material is deposited onto a surface. For example, additive manufacturing (AM) can be used to add various solid materials onto surfaces to create larger parts or articles. While the exact methodology can vary, SSM typically uses a feedstock material, such as extrusions, castings, bars, rods, wire, and plates, which is pushed through a tool and deposited onto a surface. A more complete description of certain SSM systems is provided below.

In certain embodiments, the tools described herein can be configured with multiple components or members which can reversibly couple to each other. This arrangement permits modification/replacement of certain members without having to replace the entire tool. Internal geometry selection of certain members can also facilitate solid material addition without the use of any lubricant. The interface of the different members can function, for example, as a heat break to reduce the amount of heat which travels from the deposition surface up the tool. The different members can be produced from high thermal conductivity materials to permit cooling and/or heating of the tool members as desired. Temperature control of the different tool members can aid in reducing sticking of the solid feedstock material to internal surfaces of the tool members. A desirable draft angle can be present in the body of one or more members and/or a face of one or more members to reduce the axial forces needed to release the solid feedstock material from internal surfaces of the tool members. The tapered nature provided by the draft angle can also permit the material to expand to some extent in the tool channel. Various other tool features are described in more detail below. The different tool members can reversibly couple to each other in a secure manner to retain the members to each other during operation of the SSM system. The members can couple to each other through various arrangements including abutting surfaces, sliding engagement, through the use of couplers and other configurations. Various components that can be present to couple different tool members to each other are described in more detail below.

The tools described herein can be used to produce many different types of parts including, for example, aircraft components, forged parts for fuselage, wings, empennage and landing gear, helicopter components, land defense vehicles, pylons, wheels, trusses, cargo and luggage racks, longerons, wing and tail ribs, spars, wing skins, pressure bulkheads, engine surrounds, actuators, stiffeners, missile tubes, refueling booms, ordnance, launch vehicles and armor plate for military vehicles and structures.

In certain embodiments, the tool can include a first member which reversibly couples to a second member. Referring to FIG. 1, a first member 100 is shown that comprises a first inlet 110, a first outlet 120 and a channel 115 that connects the first inlet 110 to the first outlet 120. The channel 115 is designed to receive solid feedstock material from a feedstock source (not shown) through the inlet 115 and either provide the solid feedstock material to another member of the tool or to deposit the solid feedstock material onto a surface through the outlet 120. In FIG. 1, the channel 115 generally comprises a constant cross-sectional shape along the length of the first member 100. As noted in more detail below, the first member 100 can reversibly couple to a second member to provide a multi-component or multi-member tool.

Figure 2:
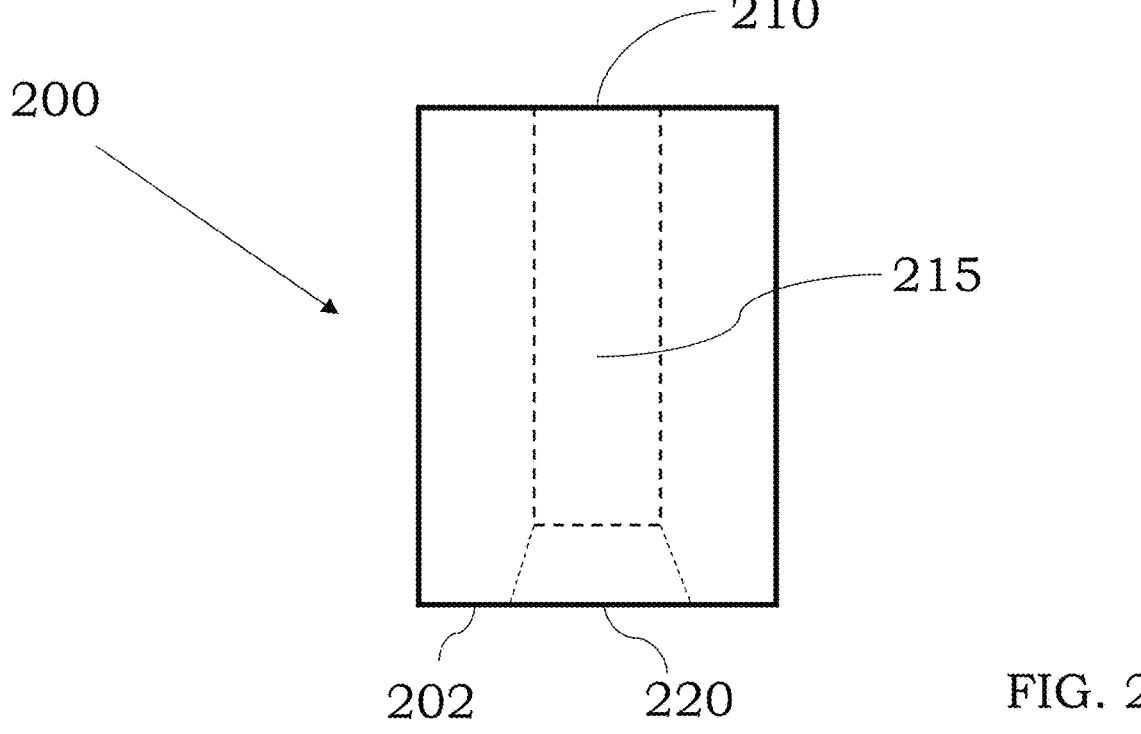
FIG. 2 is an illustration of a tool member including a draft angle.
Figure 3:
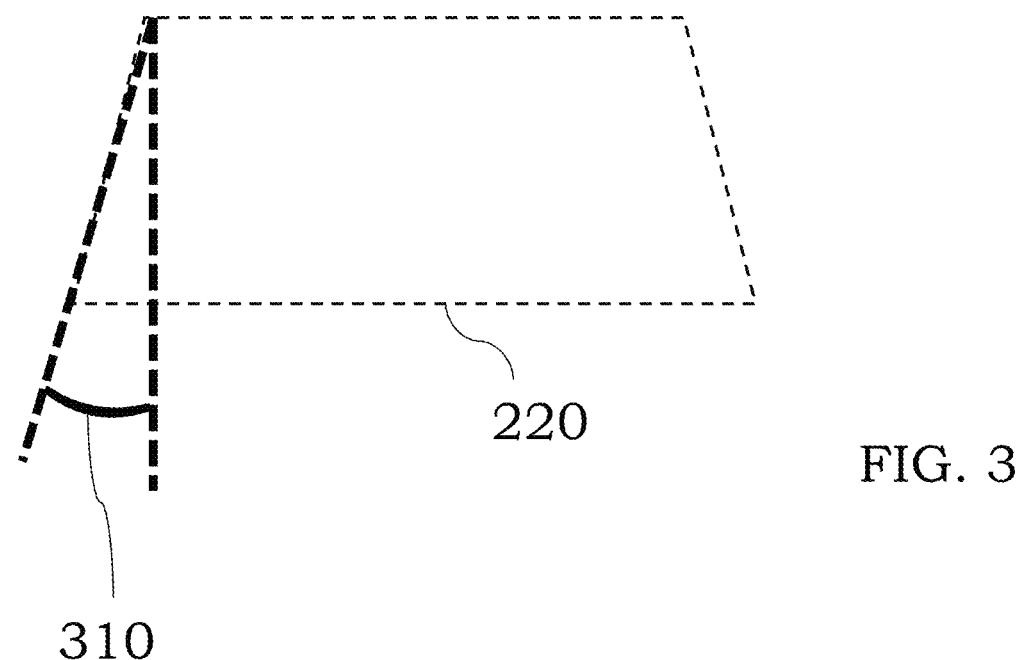
FIG. 3 and FIG. 4 are illustrations showing draft angles.
Figure 4:
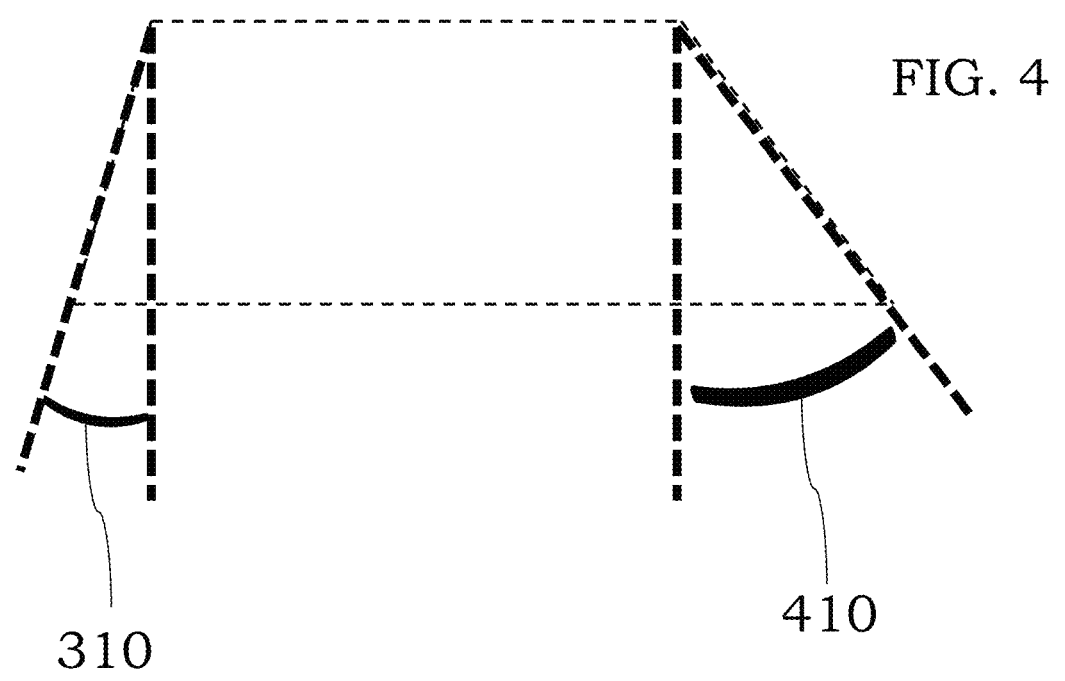

In configurations where a face 102 of the first member 100 is placed against a surface that receives the solid feedstock material, the channel of the first member can include a draft angle as shown in FIGS. 2 and 3. Referring to FIG. 2, a first member 200 comprises a first inlet 210, a first outlet 220 and a channel 215 between the first inlet 210 and the first outlet 220. The channel 215 has a larger diameter at the outlet 220 than at the inlet 210 as shown in the expanded view in FIG. 3. This arrangement provides a draft angle 310 which can assist in releasing the solid material within the channel 215 from the tool member 200 and can permit the solid material in the channel 215 to expand to some degree as it is pushed through the channel 215. The exact draft angle may vary from 1 degree up to about 30 degrees, e.g., 2 degrees to 25 degrees or 3 degrees to 20 degrees or 4 degrees to 19 degrees or 5 degrees to 18 degrees or 6 degrees to 17 degrees or 7 degrees to 16 degrees or 8 degrees to 15 degrees or 9 degrees to 14 degrees or any number between 1 degree and 30 degrees. While the draft angle 310 in FIG. 3 is symmetrical within the channel 215, the draft angle could be different at each side of the channel 215. An illustration is shown in FIG. 4, where the draft angle 310 is shown as being less than a draft angle 410. If desired, one side of the channel (when viewed in cross-section) could be linear and not include any draft angle at all.

Figure 5:
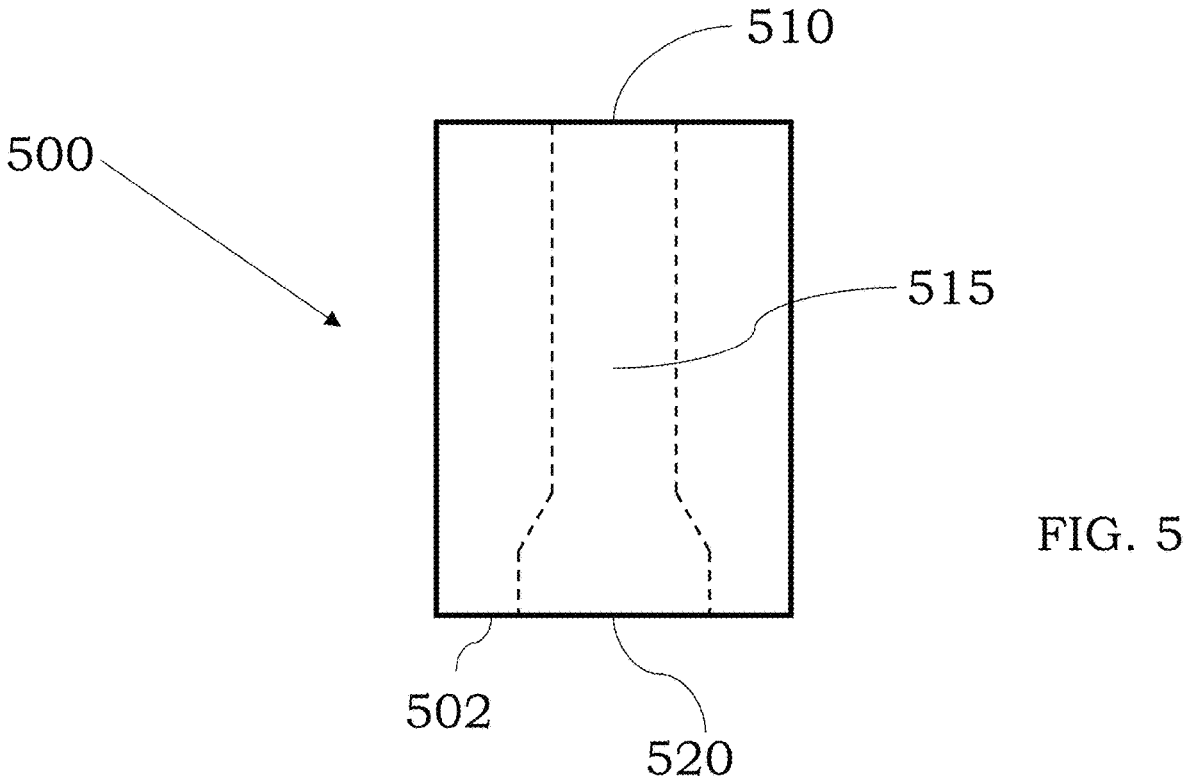
FIG. 5 is an illustration of a tool member including a draft angle.
Figure 6:
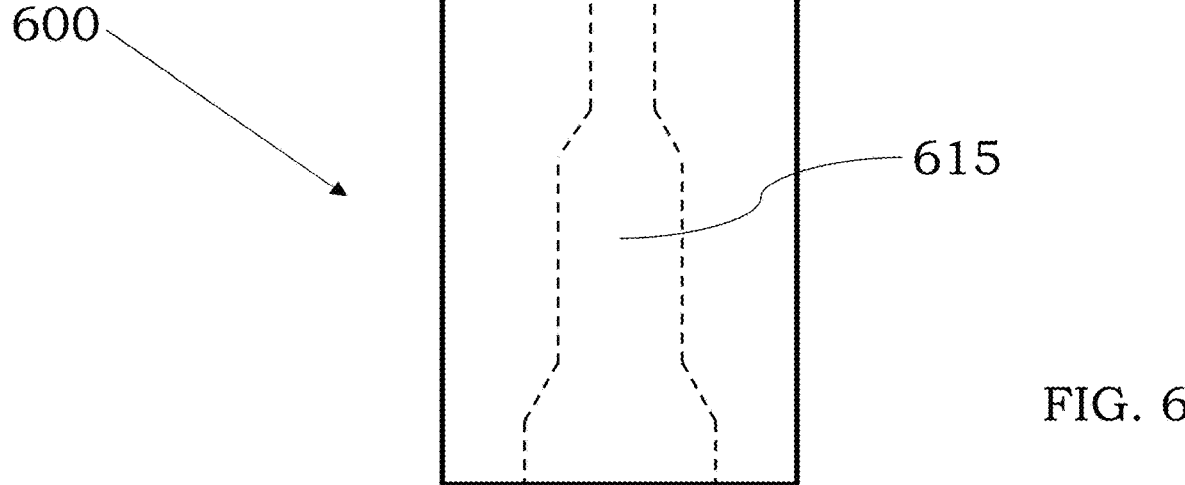
FIG. 6 is an illustration of a tool member including multiple draft angles.

In certain embodiments, the draft angle in the channel need not be directly adjacent to the face of the tool which is placed against a surface. For example and referring to FIG. 5, a tool member 500 with an inlet 510, an outlet 520 and a channel 515 has a draft angle distal from a face 502 of the tool member 500. The exact distance of the vertex of the draft angle can be 8 mm to 25 mm from the face 502 of the tool member 500. If desired, multiple draft angles can be present in a channel of a tool member as shown in FIG. 6. The channel 615 of the tool member 600 thus has different diameters at different areas along the longitudinal axis of the channel 615. Inclusion of multiple draft angles within the tool 600 can reduce sticking of the solid material in the channel to the walls of the channel. This result can permit the solid feedstock material to be used without a lubricant during operation of the tool to deposit the solid material. The tool is typically rotated during use of the SSM, and the presence of a draft angle can permit expansion of the solid feedstock material in the channel during rotation of the tool.

In certain configurations, the tools described herein can include multiple members which can reversibly couple to each other. The members may each be generally sized with similar dimensions or can include different dimensions. For example, one member can be configured with a generally cylindrical geometry and can couple to a second member which is more annular in nature and can include structures that provide a desired draft angle. The interface where the tool members couple to each other can provide a thermal break to reduce movement of heat up the tool. If desired, a gasket, cooling ring or other material may be present at the interface to facilitate coupling of the two members and/or heat removal. The exact number of members present can vary from two up to ten. Further, the members can be packaged into a kit including multiple different members to permit an end user to assemble a multi-component tool with desired physical features.

Figure 7:
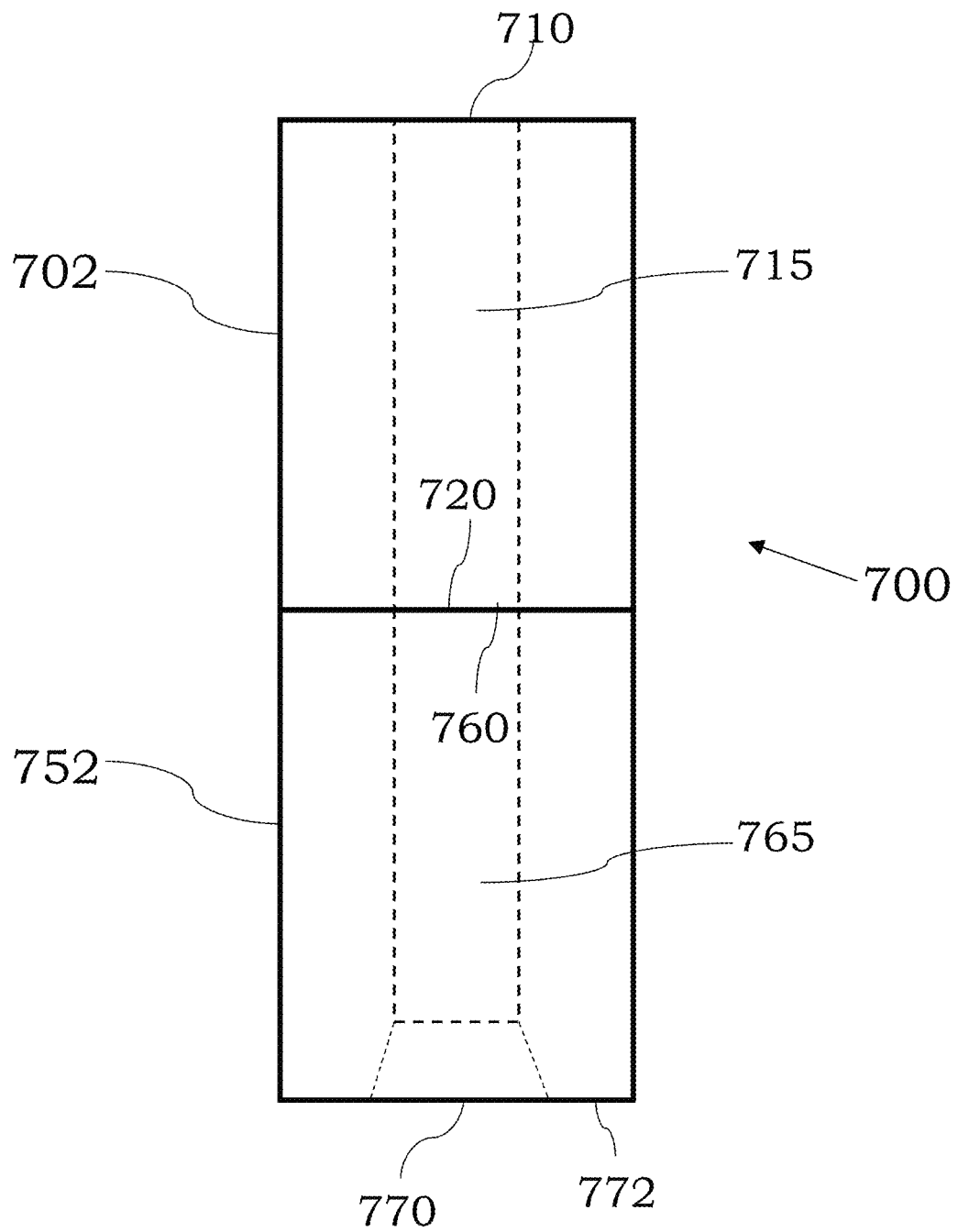
FIG. 7 is an illustration showing two tool members coupled to each other.
Figure 8:
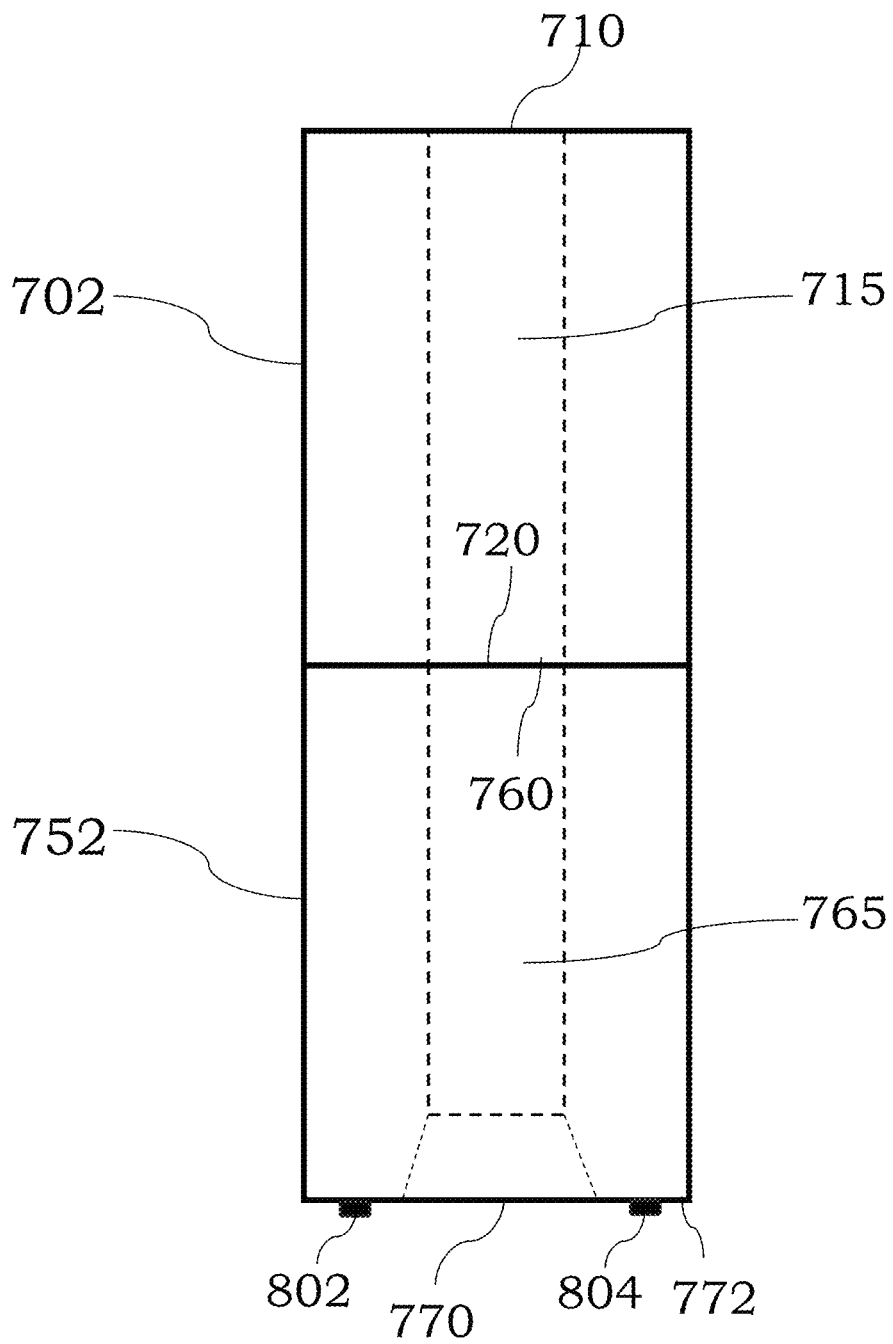
FIG. 8 is an illustration showing two tool members coupled to each other with one tool member including a draft angle.

One arrangement is shown in FIG. 7, where a tool 700 includes a first tool member 702 and a second tool member 752 reversibly coupled to each other. The first tool member 702 includes a first inlet 710, a first outlet 720 and a first channel 715. The second tool member 752 includes a second inlet 760, a second outlet 770 and a second channel 765. When the members 702, 752 are reversibly coupled, surfaces of the members 702, 752 abut each other, and the coupling connects the channels 715, 765 to permit solid feedstock material to be provided from the channel 715 and into the channel 765. In use of the tool 700, the solid feedstock material in the channel 765 can be pushed toward the face 772 of the tool 700. As noted in more detail below, the tool 700 can be rotated and/or translated along a surface to deposit the solid feedstock material in the channel 765 onto the surface and/or stir the material on the surface as it is being deposited. In general, the face 772 of the tool 700 can rotate while being placed against the surface to create frictional deformation of the solid material and permit the solid material to be deposited into the surface. If desired, the face 772 can include one or more friction bosses or shoulders such as bosses 802, 804 shown in FIG. 8. The exact number of friction bosses present on the face of any tool member may vary from zero to twenty, more particularly one to fifteen or two to twelve. The friction boss(es) can act to increase stirring of the material as the solid material is deformed and deposited onto the surface. The cross-sectional shape of the friction boss may be circular, elliptical, square, round, teardrop, triangular, hexagonal, octagonal or other shapes. Where more than a single friction boss is present, different friction bosses may have different cross-sectional shapes.

Figure 9:
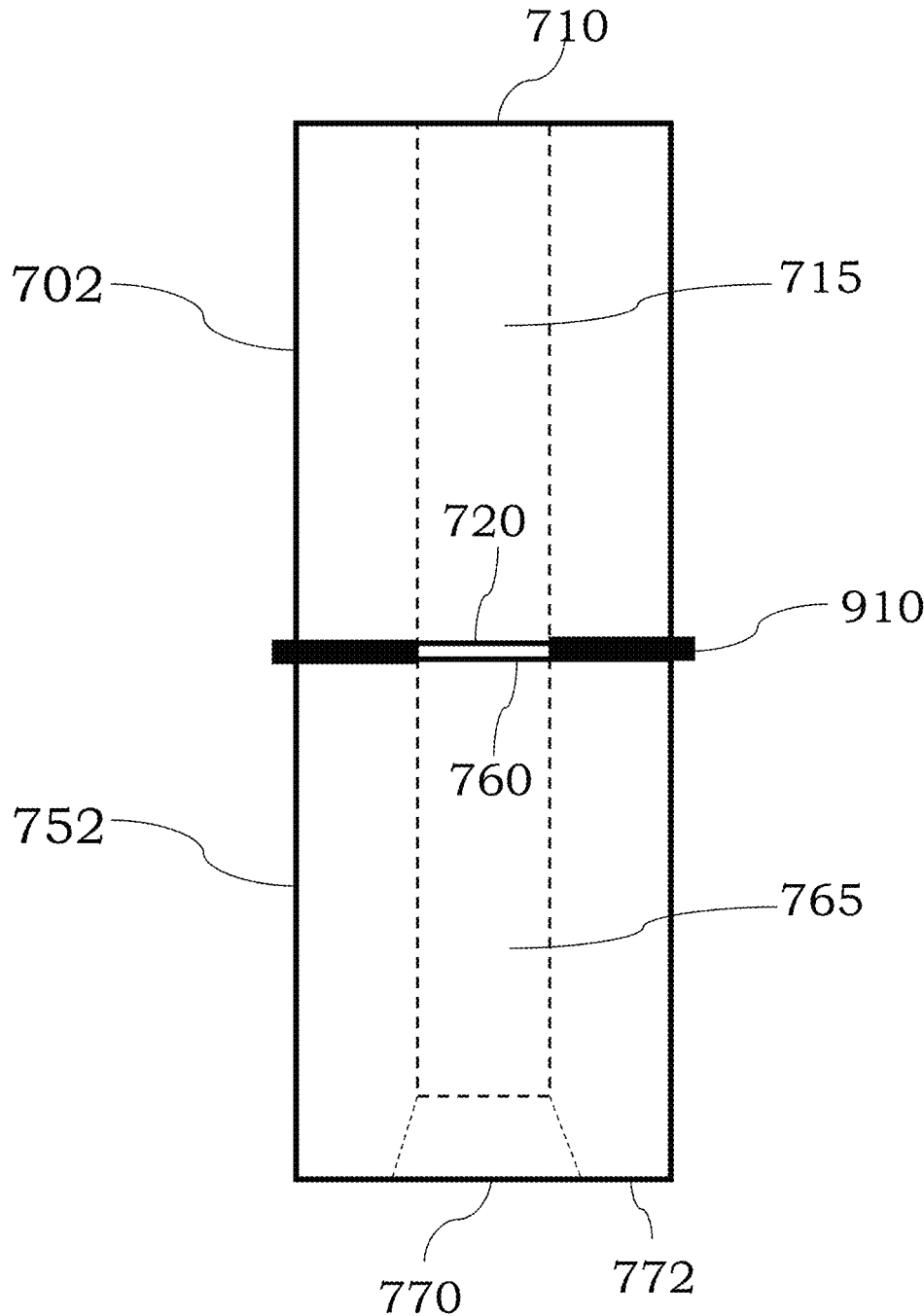
FIG. 9 is an illustration showing two tool members coupled to each other through a gasket.

In certain embodiments, the tool members can be directly coupled to each other without any intervening material or component (as shown in FIG. 7) or can be coupled to each other through a gasket, ring or other material. For example and referring to FIG. 9, a gasket 910 is present between the first member 702 and the second member 752. The gasket 910 can be produced from similar or different materials as the materials used to produce the members 702, 752. In some instances, the gasket 910 can act as a thermal break to reduce heating of the first member 702 by way of heat transfer from the second member 752. For example, friction between the face 772 and a surface that receives the solid feedstock material can cause heating of the tool member 752. This heat can travel up the tool and into the tool member 702 which can increase sticking of the solid feedstock material to the channel 715. The gasket 910 can act to dissipate travel of heat up the tool toward the tool member 702.

Figure 10:
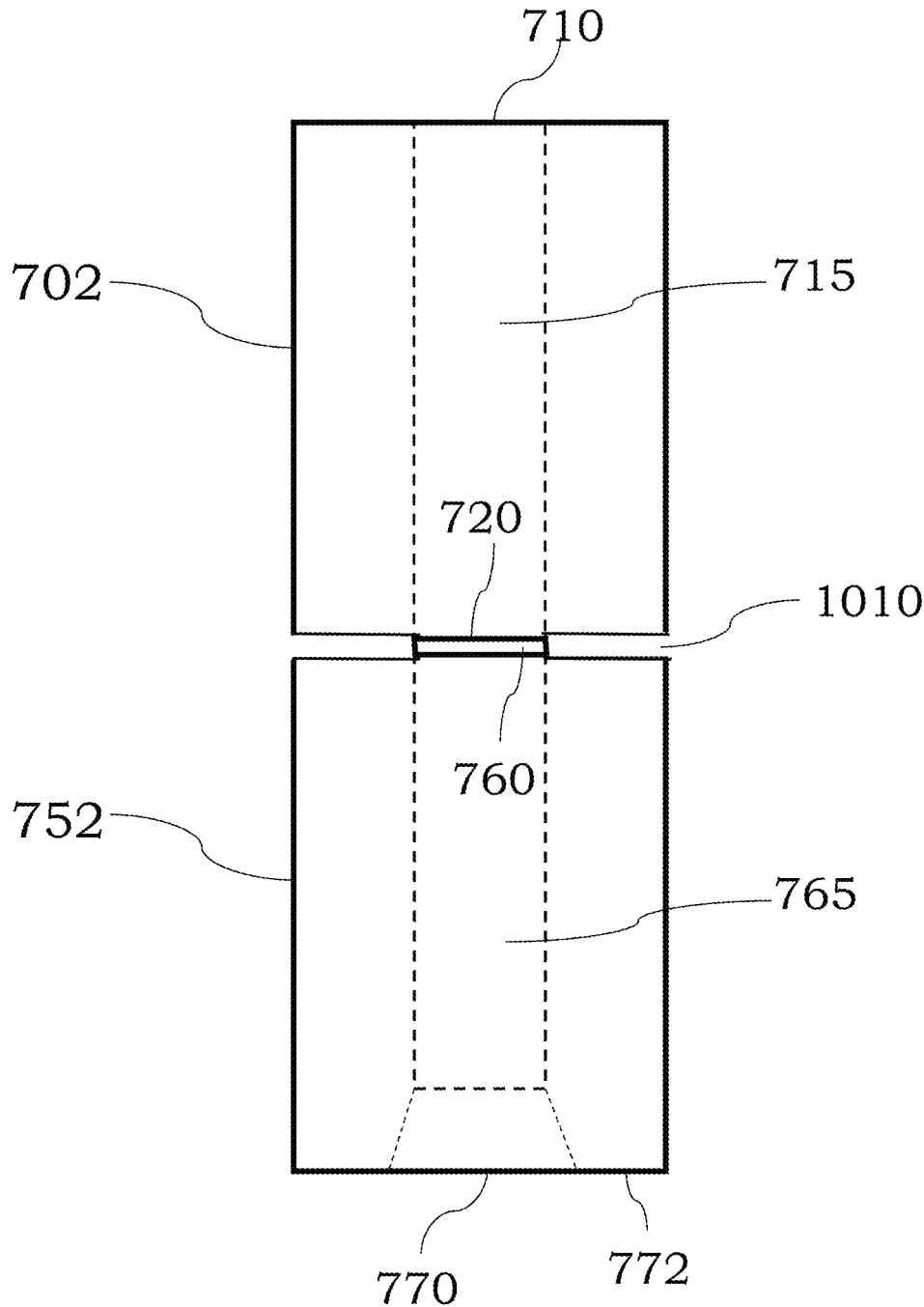
FIG. 10 is an illustration showing an air gap between two tool members.

In other embodiments, the tool members can be separated spatially to permit a cooling gas or fluid to flow around the outside of the tool members. Referring to FIG. 10, an air gap 1010 is shown between the two members 702, 752 and can act to transfer heat to the environment from the tool member 752 instead of transferring heat to the tool member 702. While not shown, a temperature jacket can be placed outside of the tool member 702, the tool member 752 or both to reduce heating and/or control the temperature of the tool.

Figure 11:
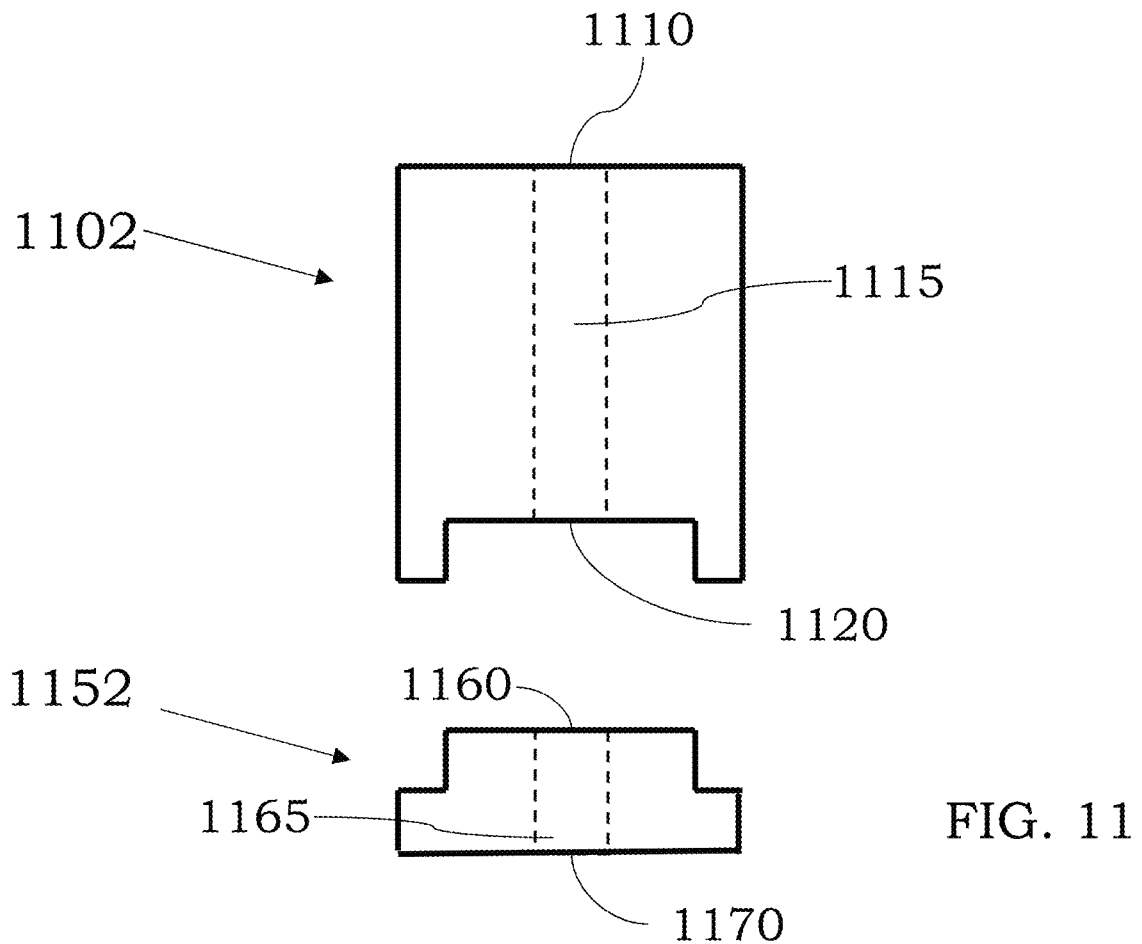
FIG. 11 is an illustration showing two tool members that can slidingly engage each other.
Figure 12:
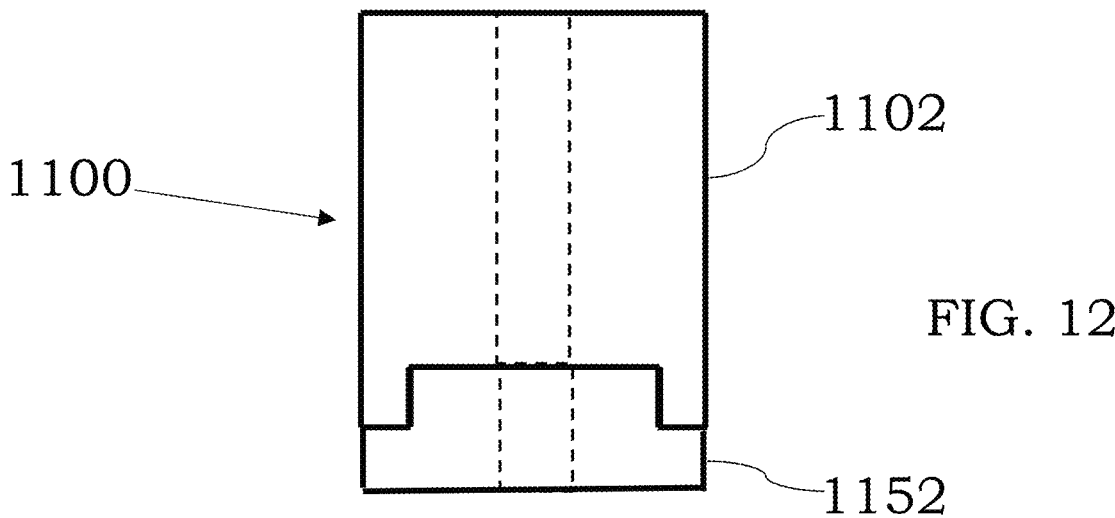
FIG. 12 is an illustration showing two coupled tool members.
Figure 13:
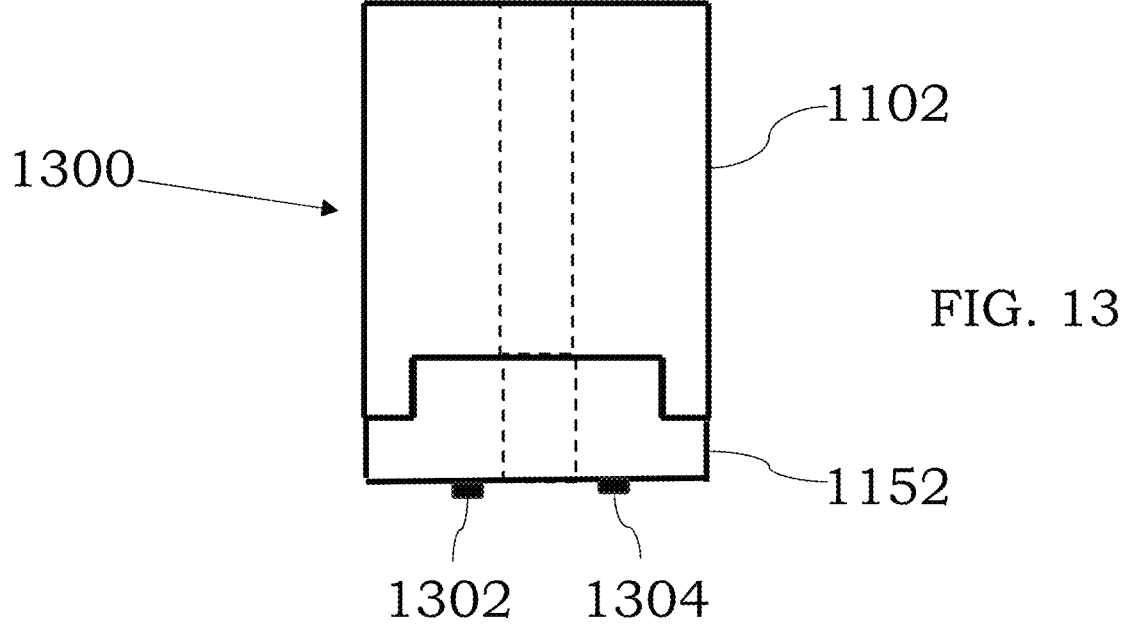
FIG. 13 is an illustration showing two coupled tool members with one tool member including friction bosses.

In certain configurations, the various tool members can slidingly engage each other as shown in FIGS. 11-13. A first member 1102 is configured as a barrel that can slidingly engage a second member 1152 at an outlet end 1120 of the first member 1102. The second member 1152 can engage the first member 1102 by sliding into an opening at the outlet end 1120. When the first member 1102 is coupled to the second member 1152, solid feedstock material can be provided to the first member 1102 through the inlet 1110 and into the channel 1115. The feedstock material, from elongated metallic and metal-based composite materials in the form of bars, rods, wires and other products, in the channel 1115 can be pushed through the first member 1102 and into the second member 1152 through the inlet 1160 and into channel 1165. The material can be deposited onto a surface by pushing the solid material in the channel 1165 through the outlet 1170 of the second tool member 1152 using the solid-state manufacturing process with the feedstock material in constant, direct contact with the substrate and previously deposited material. If desired a face of the second tool member 1152 can include friction bosses 1302, 1304 as shown in FIG. 13. The tool members 1102, 1152 can be coupled to each other using fasteners or couplers present on the two members 1102, 1152.

Figure 14:
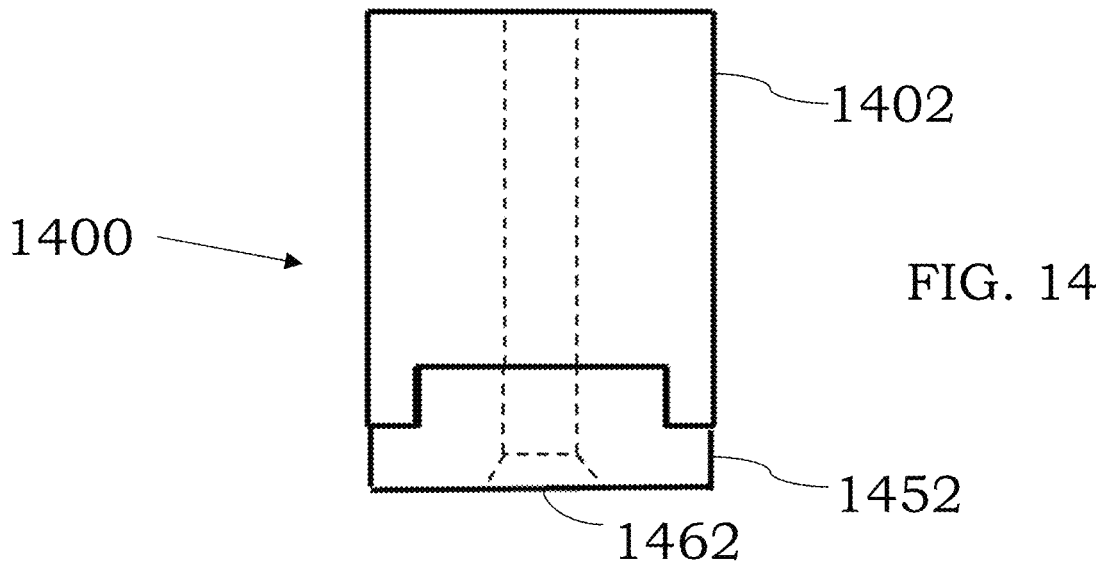
FIG. 14 is an illustration showing two coupled tool member with one tool member including a draft angle.

In certain embodiments, one or more of the tool members that slidingly engage each other can include a draft angle. Referring to FIG. 14, a tool 1400 includes a first member 1402 that slidingly engages a second member 1452. An end 1462 of the second member 1452 includes a draft angle. As noted herein, the presence of a draft angle within the channel of a tool member can reduce sticking of the solid feedstock material to the channel. This result permits use of the feedstock material without any lubricant or other materials on the surface of the feedstock material. By omitting the lubricant, the resulting deposited solid material includes a higher percentage of the solid material on the surface and can be free or substantially free of the lubricant material. If the lubricant material is entrained within the build, it can cause integrity problems for the final part.

Figure 15:
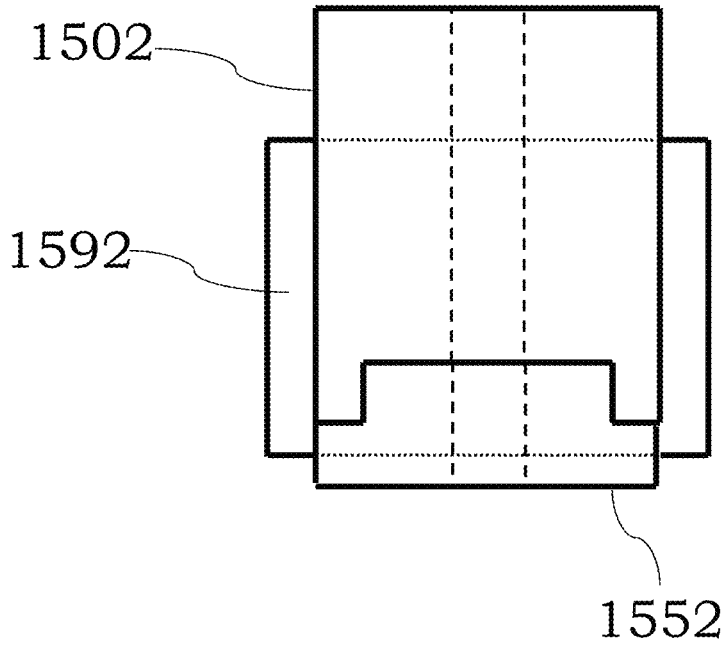
FIG. 15 is an illustration showing three tool members.
Figure 16:
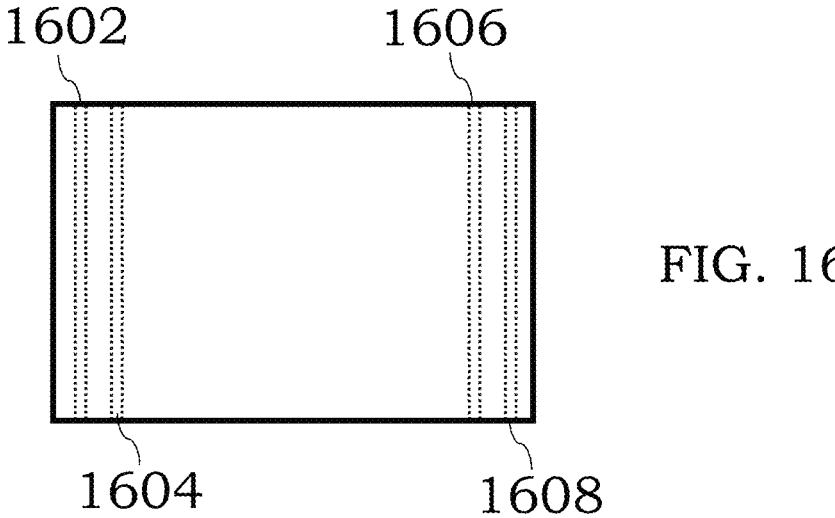
FIG. 16 is an illustration showing a tool member with internal channels.

In certain configurations, the tool can include three or more members if desired. Referring to FIG. 15, a tool 1500 includes a first member 1502, a second member 1552 and a third member 1592. The first member 1502 slidingly engages the second member 1552. The third member 1592 slidingly engages both the first member 1502 and the second member 1552 and is positioned around the members 1502, 1552. Fasteners (not shown) can hold the members 1502, 1552 and 1592 to each other or (as noted below) the various members 1502, 1552, 1592 can include couplers which can couple the various members 1502, 1552, 1592 to each other. In some instances, the tool member 1592 (see FIG. 16) can include internal channels or openings 1602, 1604, 1606, 1608 which can be used to provide temperature control to the other tool members 1502, 1552. For example, a fluid can be circulated into and out of the internal channels 1602, 1604, 1606, 1608 or the internal channels 1602, 1604, 1606, 1608 can be designed to passively remove heat from the tool members 1502, 1552 if desired. While not shown, the tool members 1502, 1552 can also include internal channels if desired to facilitate temperature control of the tool members 1502, 1552. If desired, the internal channels may adopt certain geometries are described, for example, in U.S. Application No. 63/545,105 filed on Oct. 20, 2023.

Figures 17, 18, 19, 20, 21, 22:
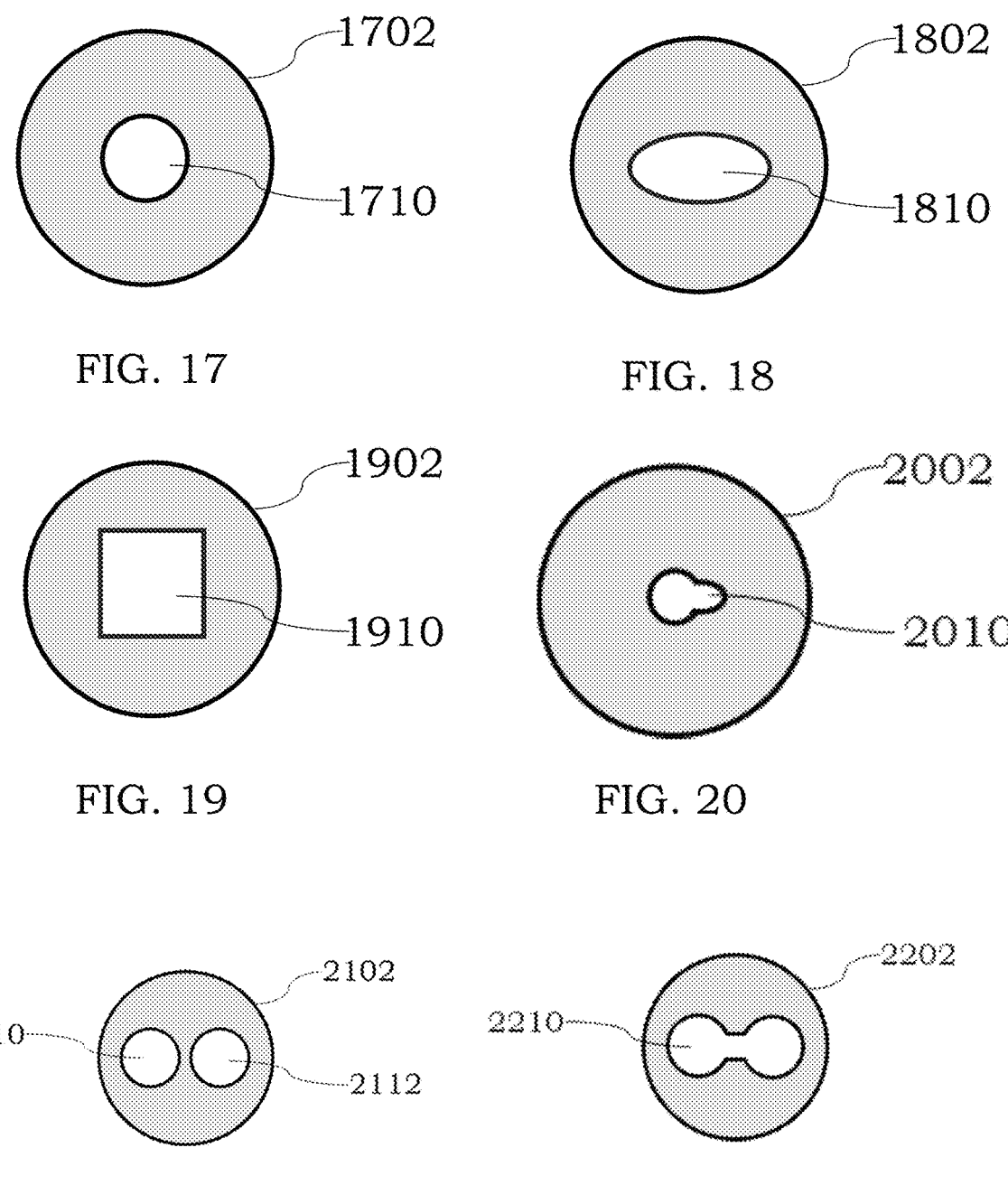
FIG. 17, FIG. 18, FIG. 19, FIG. 20, FIG. 21 and FIG. 22 are illustrations showing different channel geometries.

In certain embodiments, the internal channel geometry of the tool members described herein can vary. Illustrations are shown in FIGS. 17-22 and include a tool member 1702 with a circular channel 1710 (FIG. 17), a tool member 1802 with an elliptical channel 1810 (FIG. 18), a tool member 1902 with a square channel 1910 (FIG. 19), a tool member 2002 with an asymmetric channel 2010 (FIG. 20), a tool member 2102 with two channels 2110, 2112 (FIG. 21), and a tool member 2202 with a barbell shaped channel 2210 (FIG. 22). The outer cross-sectional shape of the tool members of FIGS. 17-22 is shown as circular, but circular shapes are not required. The tool member cross-sectional shape may be square, rectangular, elliptical, or have other geometric shapes. Any of the channel geometries can also include a draft angle as noted herein.

In certain embodiments, one or more tool members can include a coupler configured to retain the tool members to each other during use of the tool. The coupler can take numerous different forms including bayonet couplers, hole/pin couplers, threaded couplers, camlock couplers, and other coupler types that can retain the tool members to each other even during high rpm rotation of the tool as noted below. In other embodiments, external fasteners including screws, bolts, rivets, etc. can be used to hold the tool members to each other. The fasteners are desirably removable to permit replacement of the tool members as needed and/or to permit disassembly of the tool for cleaning.

In some configurations, the tool members can be produced from numerous different types of materials. In general, the tool member has a higher hardness than the solid feedstock material to resist degradation during deposition of the solid feedstock material on a surface. For example, steel materials including tool steel with high hardness and steel alloys can be used to produce the tool members. The exact material used can be selected based on the solid feedstock material to be deposited and the desired part to be produced. In some embodiments, the tool member can include a material with a high thermal coefficient to facilitate heat removal from the area adjacent to the surface where deposition occurs. In addition, the interface between the tool members can act as a heat break to facilitate removal of heat from the tool and reduce heat transfer up the tool. In certain embodiments, at least one tool member can include a thermal conductivity of at least 125 W/m-K as measured by ASTM C177-04. This test method is comparable, but not identical, to ISO 8302. One or more tool members can also include surface coatings if desired.

In certain embodiments, the tools described herein can be used in a solid state manufacturing system to deposit solid material onto a surface to build up material and form an article. In some examples, the SSM system may use a friction stir additive process to build parts using a solid-state method that can produce large three-dimensional shapes without melting and resolidifying the metal and without expensive tooling. Compared to casting, the properties and metal integrity (density, constituent particles, voids) are much better for the SSM process. Compared to machined plate, much thicker parts can be produced as plate is limited to approximately 200 mm or 250 mm high walls for certain alloys and even the 200 mm thick plate can have significantly reduced strength because of the slow quench for thick products. The SSM process allows the parts to be tailored and designed in ways that are not possible for forgings because there are few limitations on geometry. For example, walls become closer together on higher deposited layers making shapes like enclosed cones possible. The resulting articles can have similar properties as plates and forgings.

In certain configurations, the exact process steps used in SSM can vary as noted in detail below. In general, and without intending to limit the particular process steps and conditions that can be used, the manufacturing process starts with a substrate, usually plate, but the substrate can be other product forms such as extrusions and forgings, then involves layer-by-layer building of parts in either single walls for thinner sections, or multiple, overlapping walls for thicker sections. By moving the depositing spindle relative to a reference point, the 3D parts are built up into selected geometries. The process controls deposition within careful parameters including external heat/cooling, deposition rate, rotational frequency, and spindle travel while monitoring temperature and using temperature feedback to determine the other parameters to achieve excellent adhesion and metallurgical bonding between each layer and overlap. Once added to the substrate in solid form, the deposited material, such as an aluminum alloy from the 2xxx, 5xxx, 6xxx, 7xxx and other families, is typically not in a near-peak strength condition, which may be usable for key applications, for example repair of existing parts by adding material to the component in specific locations. For many components, heat treatable alloys can then be solution heat treated, quenched and aged post-deposition to provide a desired temper or other properties. The material can be removed from the substrate post-deposition, or the substrate may remain in contact with the added material and used to form the final part. The tools described herein permit the material to be used without first adding a lubricant to the feedstock material.

Figure 23:
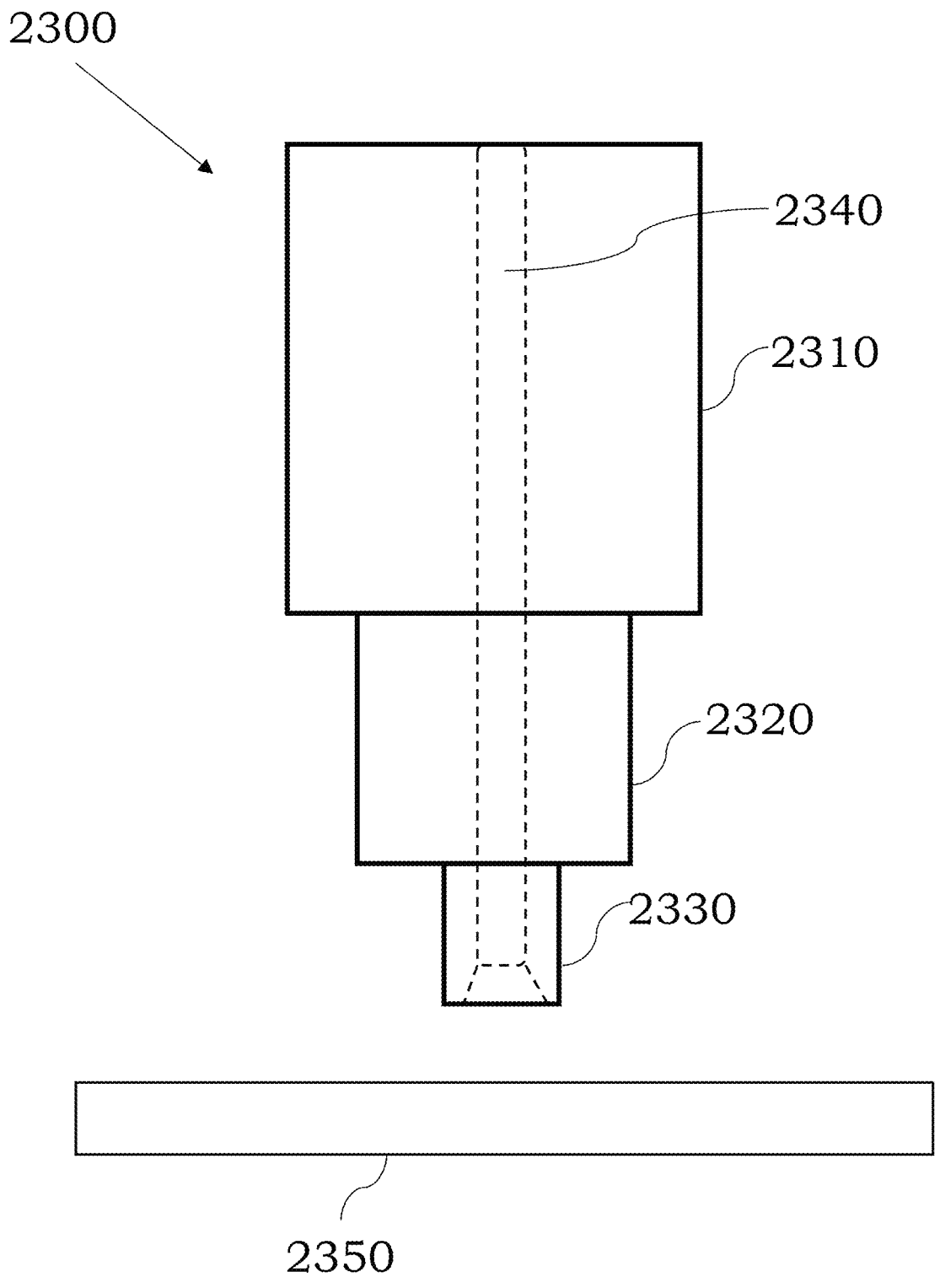
FIG. 23 is an illustration showing a SSM system.

In certain embodiments, a schematic of various components of a solid state additive manufacturing system is shown in FIG. 23. The system 2300 includes a feeding unit 2310, spindle 2320, and a tool 2330. A passageway (throat) for the alloy filler material (feedstock) 2340 is shown. The system 2300 can include other components as noted below. A substrate 2350 is shown that receives the printed alloy material from the tool 2330. The alloy material can be fed into the throat 2340 from the feeding unit 2310 at a desired rate as noted below. For example, a piston or rod can be used to push the alloy feedstock material toward a surface of the substrate 2350. The spindle 2320 is generally coupled to a motor (not shown) to rotate the spindle 3220 and tooling 2330 at a desired rotational speed. The tooling 2330 is placed adjacent to the substrate 150 and deposits the alloy material in the throat onto the surface of the substrate 2350 in solid form. As noted in more detail below, the tooling 130 can include surface features, e.g., friction bosses, and/or certain geometries, e.g., draft angles, to assist in deposition of the alloy material onto the surface of the substrate 2350 without the need to use any lubricant on the alloy material. The tooling 2330 generally comprises a non-consumable body (as noted herein) formed from material capable of resisting deformation when subjected to frictional heating and compressive loading at the surface of the substrate 2350. The tooling 2330 can include multiple different members coupled to each other. As the spindle 2320 and tooling 2330 rotate, a thin layer or track of the alloy material is deposited onto the surface of the substrate 2350. The deposition temperature can be tightly controlled to impart a desired microstructure, and correspondingly provide desired deposited alloy material properties, to the deposited material after heat treatment. The deposition temperature may be lower during initial deposition of alloy material onto the substrate 2350 and can be increased during addition of successive layers/walls/tracks to provide a desired metallurgical bond between the multiple walls/layers/tracks. The exact temperature difference can vary depending on the particular alloy material that is used.

In certain embodiments, the system 2300 can include suitable platforms, motors or other components to permit the substrate 2350 to move independently of the spindle 2320 and the tooling 2330. For example, each of the substrate 2350 and the tooling 2330 can independently be moved in x-, y-, and z-directions. This independent movement provides for production of complex geometric shapes, varying thicknesses across the surface of the produced part and permits for enhanced control of the various components during deposition of the alloy feedstock material onto a surface of the substrate 2350.

Figure 24:
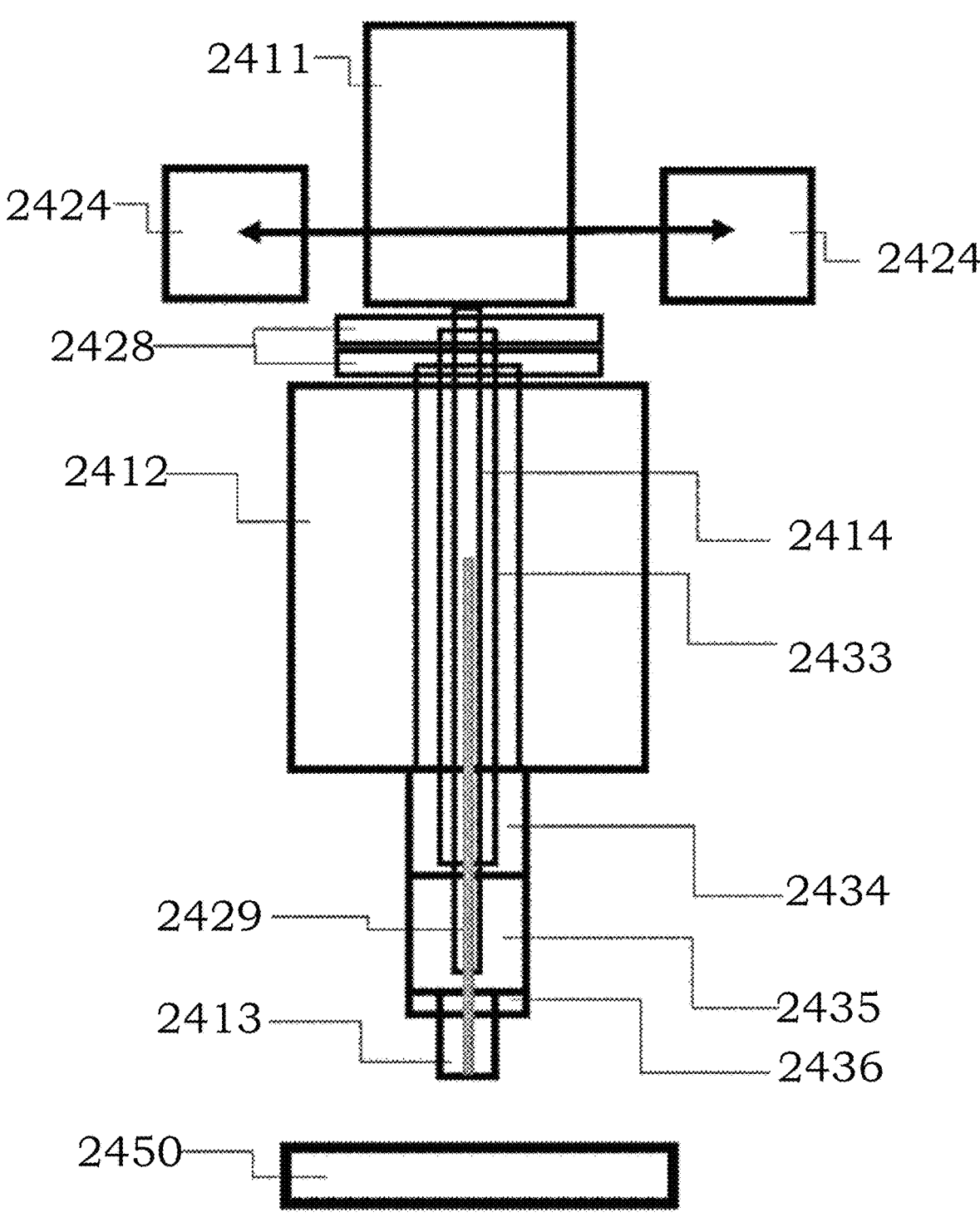
FIG. 24 is an illustration showing another SSM system.

In certain configurations, the feeding unit of the system 2300 generally comprises a reservoir configured to receive the alloy feedstock material. The exact shape and configuration of the reservoir may vary depending on the particular form of the alloy feedstock material to be used. The alloy feedstock material can be fed in a continuous or noncontinuous manner as desired. An illustration of certain components of a feeding unit configured to feed continuous solid rod or solid rod-like alloy material is shown in FIG. 24. The feeding unit 2411 is shown being placed in communication with a spindle 2412 and a tool 2413. A throat or operational passageway 2414 is shown along with a substrate 2450 that can receive the alloy filler material. Other system components, such as the motors 2424, drive pulleys 2428 for spindle 2412, alloy rod filler material 2429, secondary spindle, which is floating (non-driven) 2433, lower spindle 2434, tool holder 2435 and a pressure plate 2436 are shown as well.

Figure 25:
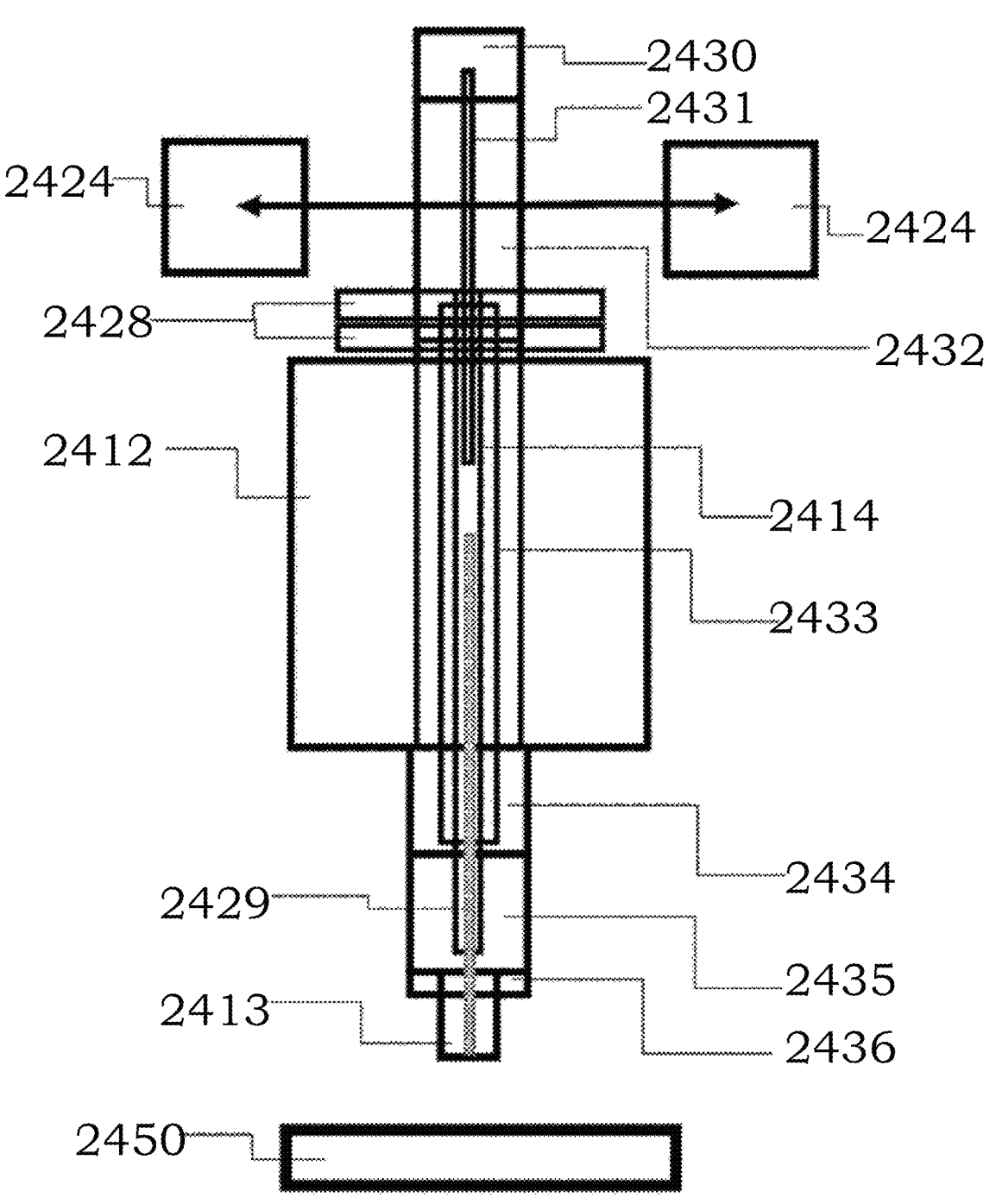
FIG. 25 is an illustration showing another SSM system.

Another illustration of a feeding unit is shown in FIG. 25. This feeding unit shown in FIG. 25 can be used to feed discontinuous solid alloy filler material, which can be in the form of rods, squares or other shapes. The illustration in FIG. 25 shows the spindle 2412 and the tool 2423 with operational passageway 2404 and the workpiece 2450. Other system components, such as the motors 2424, drive pulleys 2418 for spindle 2412, rod filler material 2429, actuator-downward force driver 2430, push rod 2431, solid feed push-rod and actuator stand with bearings 2432, secondary spindle, which is floating (non-driven) 2433, lower spindle 2434, tool holder 2435 and a pressure plate 2436. In certain embodiments, the feeding unit can include and use an actuator 2430, a push rod 2431, two guide rods and cross member, wherein the actuator creates a downwards force to push the alloy feedstock material through the throat 2414 and onto the substrate. The guide rods and cross member are optional and can be present for stabilizing the push rod 2431.

Figure 26:
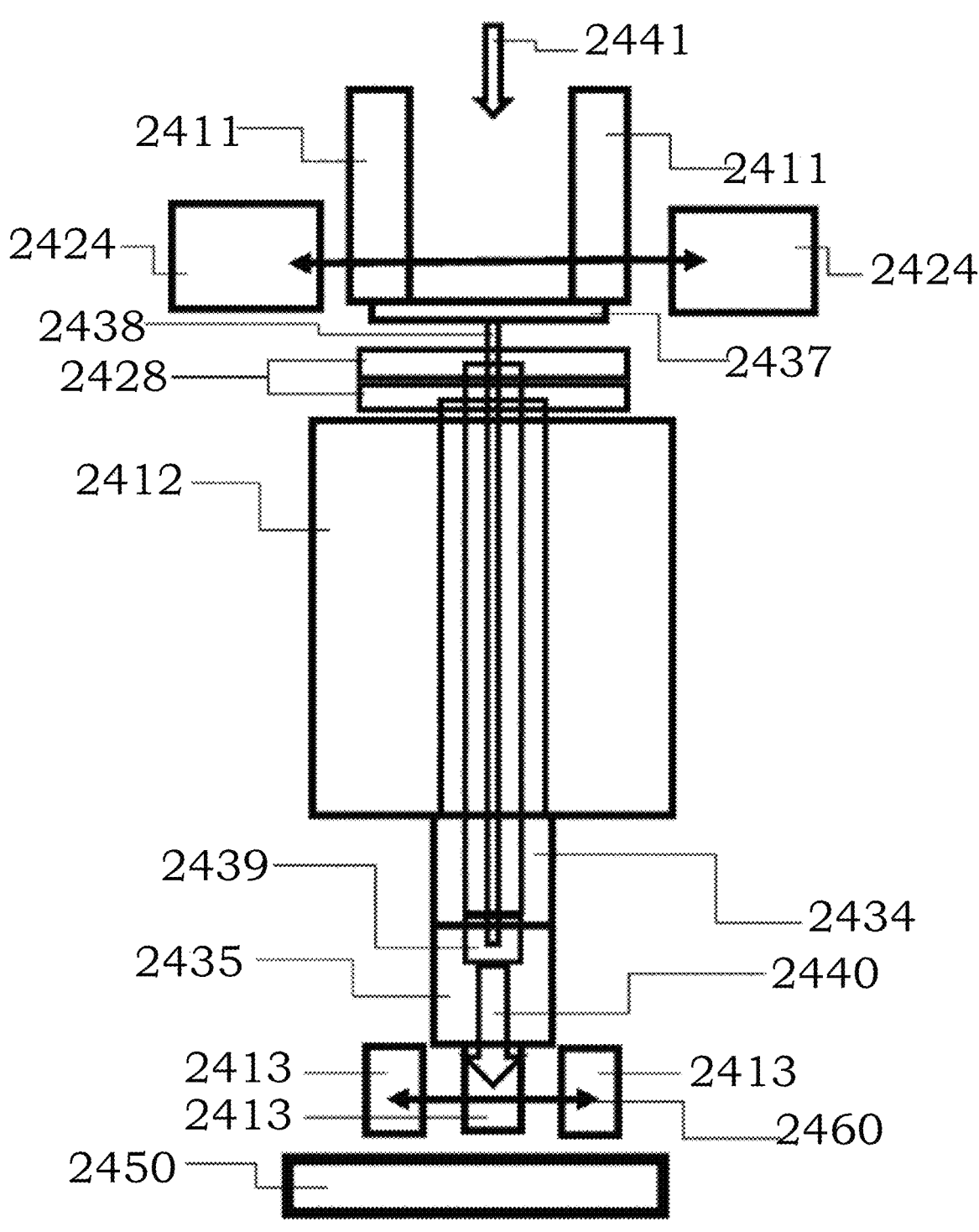
FIG. 26 is an illustration showing another SSM system.

Another illustration of a feeding unit is shown in FIG. 26. This feeding unit shown in FIG. 26 can be used to feed powder, particle or pellet type alloy filler material. Shown in cross-section in FIG. 26 are a feeding unit 2411, spindle 2412 and tools 2413 with operational passageway 2414 and a substrate 2450 that can receive the powder- or pellet-like filler alloy material from the tool 2413. Other system components, such as the motors 2424, drive pulleys 2428 for the spindle 2412, secondary spindle, which is floating (non-driven) 2433, lower spindle 2434, tool holder 2435, pressure plate 2436, lateral delivery system 2437, mixing downtube 2438, auger drive mechanism 2439, auger assembly 2440 and optional injection ports for liquid additives (e.g. lubricants, catalysts, etc.) 2441 are shown. A tool changer 2460 is also shown and discussed in more detail below.

While the illustrative feeding units shown in FIGS. 24-26 are configured to provide different types of alloy filler material to an underlying substrate, combinations of different alloy filler can also be present in a feeding unit and provided to the tooling for deposition on a substrate. The tool holder 2435 with throat is capable to hold and rotate the tool, and the throat allows alloy feedstock material to be provided from the feeding unit to the substrate.

In certain embodiments, a tool changer 2460 can be present to enable change of one or multiple different tools. For example, the tool changer 2460 can permit changing one tool with the same tool for the purpose of replacing a worn tool of the same type, or a different tool with the purpose to impart a different functionality in the deposited layer during the deposition process can be changed. A tool changer 2460 is optional and may be omitted if desired. The tool changer 2460 can comprise a variety of tools disposed in dormant positions (e.g., waiting to be used) and can comprise a mechanism for automatically or manually positioning a selected tool into an active position (e.g., where the tool can actively be used). For example, different tools can be used to deposit a first track and additional tracks on the first track. Alternatively, different tools can be used to deposit different shapes or geometries onto the substrate.

The SSM's described herein advantageously use tool or tooling which is non-consumable and is configured to deposit the alloy feedstock material onto a substrate without first applying a lubricant to the alloy feedstock material. The tool or tooling can be configured to exert frictional and other forces on the alloy feedstock material for imparting rotation to the alloy feedstock material from the body of the tool when rotated at a speed sufficient for imposing frictional heating of the alloy feedstock material against a substrate. As described herein, the tool generally comprises a body with a throat which is in communication with the feeding unit to receive material from the feeding unit. The body is designed to deposit the received alloy feedstock material from the throat onto the substrate. The body can be configured with one or more surface features constructed and arranged to trap deposited alloy material loaded on the substrate in a space or volume between the body and the substrate. The trapped material can be subjected to forming and/or shearing forces to deposit the alloy material in solid form onto a surface of the substrate. Multiple tool members can be coupled to each other to permit passage of the feedstock material from one tool member to another. In certain embodiments, the tool or tooling can be produced using materials with a higher hardness than the alloy material to be deposited and harder than the substrate. For example, the tool or tooling may comprise tool steel, copper and copper alloy materials, tungsten or tungsten alloy materials, and other metals which in pure or alloy form have a higher Vickers hardness than the alloy to be deposited and the substrate material. By selecting a higher hardness for the tooling material, the tooling generally is not consumed or deformed during the deposition process and can be used to provide multiple tracks on the substrate without the need to change the tool.

In certain embodiments, the throat of the spindles and tools described herein may have different lengths, shapes and geometries as desired. For example, the cross-sectional shape of the throat may be square, rectangular, circular, elliptical, oval or other shapes. Further, the cross-sectional shape, diameter, etc. need not be the same from a top edge of the tool to a bottom edge of the tool. The diameter can increase or decrease toward the surface of the tool to be placed adjacent to the substrate. For example, the tool can include a draft angle proximate to the substrate 2450.

Figure 27:
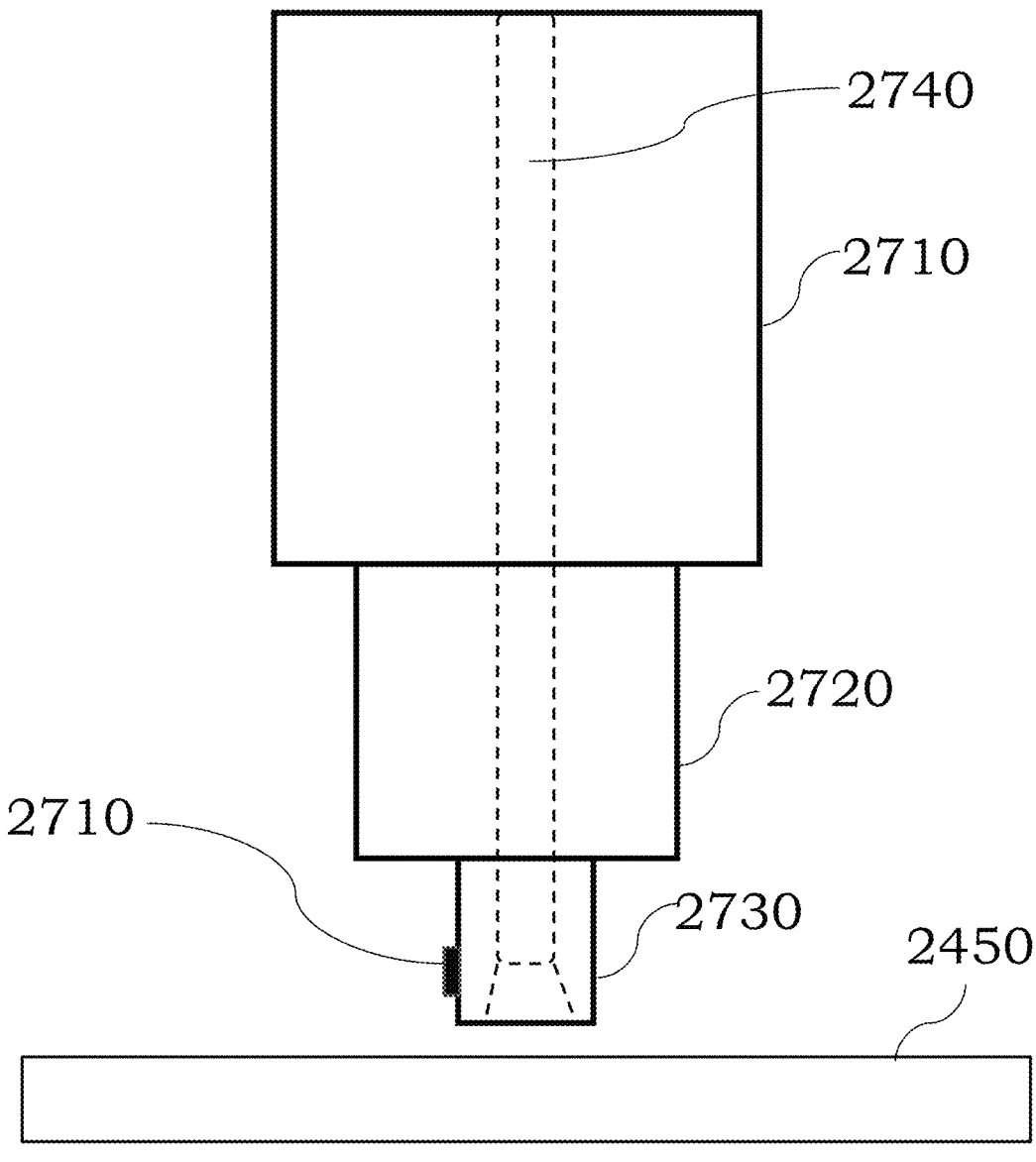
FIG. 27 is an illustration showing another SSM system.

While not shown the system can also include other suitable components including, but not limited to, gas supplies, external energy sources, ovens, thermocouples, motors, platforms, etc. In certain embodiments, the tool can include, or can be configured to receive, a temperature sensor as shown in FIG. 27. The tool 2730 can include a temperature sensor 2710, which can be integral to the tool or added separately to the tool 2730 and may be present on an external surface of the tool 2730 or an internal surface of the tool 2730. The sensor 2710 can be designed to indirectly monitor the temperature at the surface of the substrate 2450 during deposition of the alloy material onto a surface of the substrate. Since it is often difficult to measure the temperature directly at the surface of the substrate 2450 during deposition, the temperature sensor 2710 can be placed a suitable distance above the surface. As noted in more detail below, a selected temperature window can be used to deposit alloy material, that after deposition and sometimes heat treatment, has desirable physical and/or mechanical properties. The temperature sensor 2710 can include a thermometer, a thermocouple, a resistive temperature measuring device, an optical device, an infrared sensor, a bimetallic device, a change-of-state sensor or other devices which can measure or sense temperature. The sensor 2710 can be coupled to the other components in a wired or wireless manner to transmit temperature information to the system. While the exact positioning of the sensor 2710 may vary, the sensor 2710 is typically located about 0.3 mm to about 0.5 mm above a surface of the substrate 2450. The temperature values described herein for producing alloy parts having certain properties refers to the temperature values measured using a sensor similar to the sensor 2710 and not necessarily the actual temperature at the interface between the tool 2730 and the surface of the substrate 2450. The tool temperature can be monitored and selecting, based on measurements from the sensor 2710, to deposit the alloy material within a selected tool temperature range.

Figure 28:
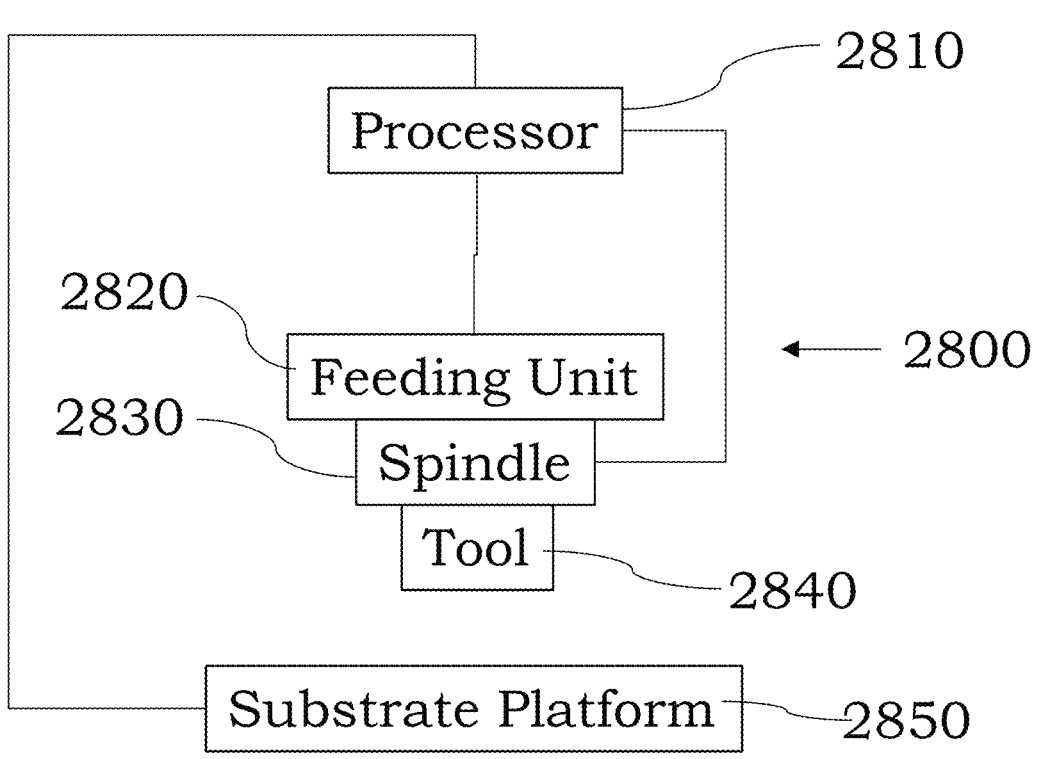
FIG. 28 is a block diagram showing certain components of a SSM system.

In certain configurations, the various components of the SSA manufacturing system are typically under control using a processor and one or more application software programs. For example and referring to FIG. 28, a block diagram of certain components is shown which can be controlled by a processor of a computer system or a dedicated processor. The system 2800 includes a processor 2810 electrically coupled to the feeding unit 2820, the spindle 2830, tool 2840 and a platform 2850 configured to receive a substrate. The processor 2810 can optionally be coupled to the tool 2840 and may also be electrically coupled to a temperature sensor (not shown) with the tool 2840. The processor 2810 can control one or more of feeding of the alloy material through the feeding unit 2820, rotational speed of the spindle 2830 to maintain a temperature setpoint, varying the spindle torque to maintain a temperature setpoint, varying the spindle power to maintain a temperature setpoint, varying the deposition rate to maintain a temperature setpoint, varying the tool traverse rate to maintain a temperature setpoint, varying the alloy filler material feed rate to maintain a temperature setpoint, varying the layer height to maintain a temperature setpoint, varying the alloy filler force to maintain a temperature setpoint, varying pressure under the tool 2840 to maintain a temperature setpoint, maintaining a temperature setpoint through an external heating source in, around, or near the tool 2840, maintaining a temperature setpoint by a source of heat under or around the material being deposited and/or under or around the platform 2850, and/or maintaining a temperature setpoint by varying the tool geometry in-situ during production. The processor 2810 can also translate the substrate platform 2850 to alter its position in the x-, y- or z-dimensions independently of movement of the spindle 2830 and/or the tool 2840. In a typical use, the substrate platform 2850 is moved independently of any movement of the tool 2840 during deposition of the alloy filler material onto the substrate platform 2850.

The SSA manufacturing system also typically includes a memory unit, storage or other electrical components. The processor 2810 can be used, in combination with one or more sensors present in the system to control the various components of the system. Such processes may be performed automatically by the processor without the need for user intervention or a user may enter parameters through a user interface. In certain configurations, the processor may be present in one or more computer systems and/or common hardware circuitry including, for example, a microprocessor and/or suitable software for operating the system. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters and/or control the system components as needed or desired. The processor may be part of a general-purpose computer such as those based on Unix, Intel PENTIUM-type processor, Intel Core™ processors, Intel Xeon™ processors, AMD Ryzen™ processors, AMD Athlon™ processors, AMD FX™ processors, Motorola PowerPC, Sun UltraSPARC, Hewlett-Packard PA-RISC processors, Apple-designed processors including Apple A12 processor, Apple A11 processor and others or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, authorized users, etc. during operation of the system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. For example, computer control can be implemented to control the temperature during deposition of the alloy material on the surface of the substrate. The processor typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, lights, speaker. The system may contain one or more communication interfaces that connect the computer system to a communication network (in addition or as an alternative to the interconnection device). The system may also include suitable circuitry to convert signals received from the various electrical devices present in the system. Such circuitry can be present on a printed circuit board or may be present on a separate board or device that is electrically coupled to the printed circuit board through a suitable interface, e.g., a serial ATA interface, ISA interface, PCI interface, a USB interface, a Fibre Channel interface, a Firewire interface, a M.2 connector interface, a PCIE interface, a mSATA interface or the like or through one or more wireless interfaces, e.g., Bluetooth, Wi-Fi, Near Field Communication or other wireless protocols and/or interfaces.

In certain embodiments, the system typically comprises a storage system which can be removable and/or can include a non-transitory computer readable medium. The storage system typically includes a computer readable and writeable nonvolatile recording medium in which codes of software can be stored that can be used by a program to be executed by the processor or information stored on or in the medium to be processed by the program. The medium may, for example, be a hard disk, solid state drive or flash memory. The program or instructions to be executed by the processor may be located locally or remotely and can be retrieved by the processor by way of an interconnection mechanism, a communication network or other means as desired. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC), microprocessor units MPU) or a field programmable gate array (FPGA) or combinations thereof. Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may also be implemented using specially programmed, special purpose hardware. In the systems, the processor is typically a commercially available processor such as the well-known microprocessors available from Intel, AMD, Apple and others. Many other processors are also commercially available. Such a processor usually executes an operating system which may be, for example, the Windows 7, Windows 8 or Windows 10 operating systems available from the Microsoft Corporation, MAC OS X, e.g., Snow Leopard, Lion, Mountain Lion, Mojave, High Sierra, El Capitan or other versions available from Apple, the Solaris operating system available from Sun Microsystems, or UNIX or Linux operating systems available from various sources. Many other operating systems may be used, and in certain embodiments a simple set of commands or instructions may function as the operating system. Further, the processor can be designed as a quantum processor designed to perform one or more functions using one or more qubits. In some instances, a simple set of commands may be present on the computer system, a table or a mobile device that can communicate with the components of the SSA system and can be updated from time to time using one or more wireless or wired connections between the control device and the SSA system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C#(C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the system may comprise a software interface on the SSA system that can receive user input and parameters from a user based on the particular alloy material to be deposited. Instructions and other information and parameters can be entered on SSA system directly through the user interface or indirectly through an interface of an associated mobile device, e.g., tablet, phone, etc., that communicates with the SSA system over a wireless or wired network. The instructions stored in the memory can execute a software module or control routine for the system, which in effect can provide a controllable model of the system to permit deposition of the alloy material in a desired manner.

In certain embodiments, the system can include one or more communications interfaces to permit the SSA system to communicate with other systems or components of the SSA system. For example, the system can include an antenna that may be one or more of a Bluetooth antenna, a cellular antenna, a radio antenna, other antennas or combinations thereof.

Figure 29:
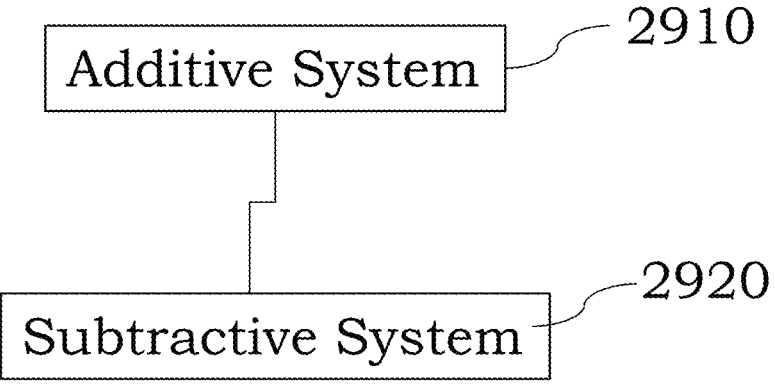
FIG. 29 is a block diagram showing a system including an additive system and a subtractive system.

In some embodiments, the system can include subtractive components in addition to additive components. For example and referring to FIG. 29, a system can include an additive system 2910 and a subtractive system 2920. The additive system 2910 can be configured as described herein, e.g., to add a titanium alloy in solid form to a surface of the substrate. The exact nature of the operations provided by the subtractive system 2920 can vary. For example, the subtractive system 2920 can be configured to provide one or more of grinding, sanding, milling, etc. to remove some of the material which was added to the substrate using the additive system 2910. The subtractive system 2920 can be used to drill holes or apertures or otherwise machine the final product produced using the additive system 2910 into a final part.

In certain embodiments, the exact materials used with the tools and systems described herein can vary. For example, high strength aluminum alloys which generally have the formula 7xxx+Cu, so Zn is the largest alloying element. These alloys also contain Cu, Mg and some type of grain refiners such Cr, Mn and/or Zr, plus small impurities and elements such as Ti and B which are important for ingot casting. Examples of high-strength aluminum alloys include 7075, 7175, 7050, 7150, 7250, 7085, 7049, 7149, 7349, 7449, 7085, 7036, 7010, but other aluminum alloys can also be used.

Certain specific examples are described to better illustrate some of the aspects of the technology provided herein.

Example 1

Figure 30:
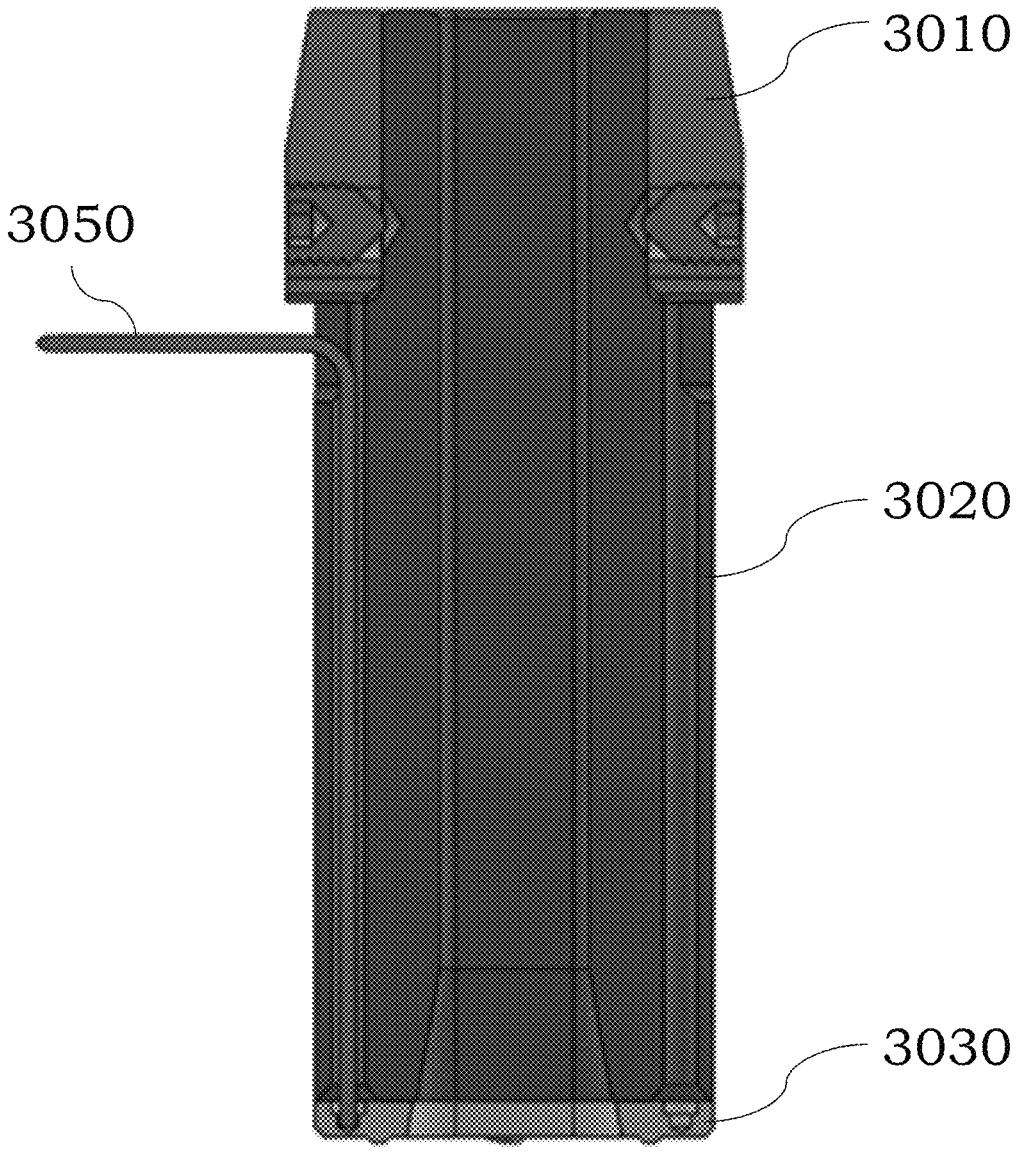
FIG. 30 is an illustration showing a three member tool.
Figure 31:
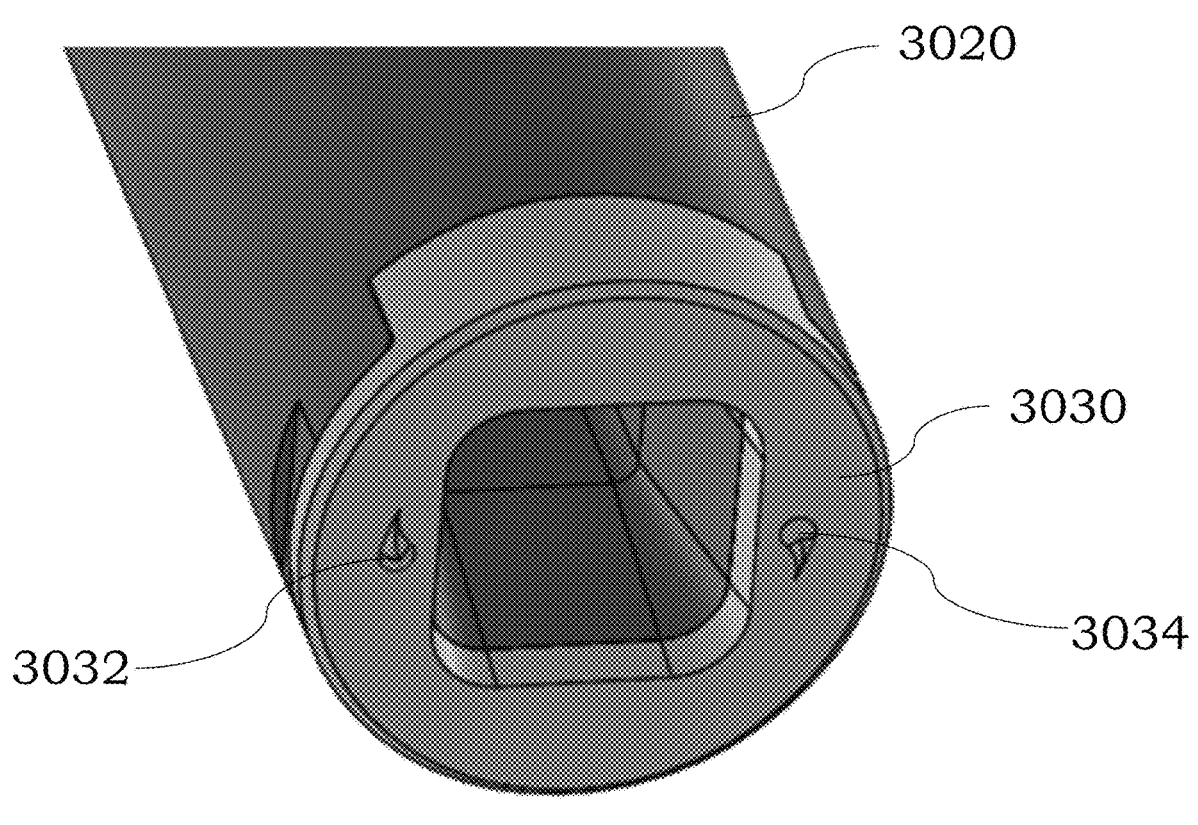
FIG. 31 is an illustration showing a draft angle of the three member tool of FIG. 30.

A three member tool was assembled to test the ability to deposit solid state material without the use of any lubricant on a 7075 aluminum alloy. An illustration of the three member tool is shown in FIG. 30 that includes tool members 3010, 3020 and 3030. An electrical line 3050 for a temperature sensor is also shown. The member 3020 included a draft angle (see FIG. 31) at an end that reversibly couples to the third member 3030. The third member 3030 was also tapered slightly. The cross-sectional shape of the channel of the tool was square as shown in FIG. 31. The tool members 3010, 3020 and 3030 were held together using mechanical fasteners. The surface of the tool member 3030 included two tear dropped shaped friction bosses 3032, 3034 configured to contact a surface that receives the solid material.

Figure 32:
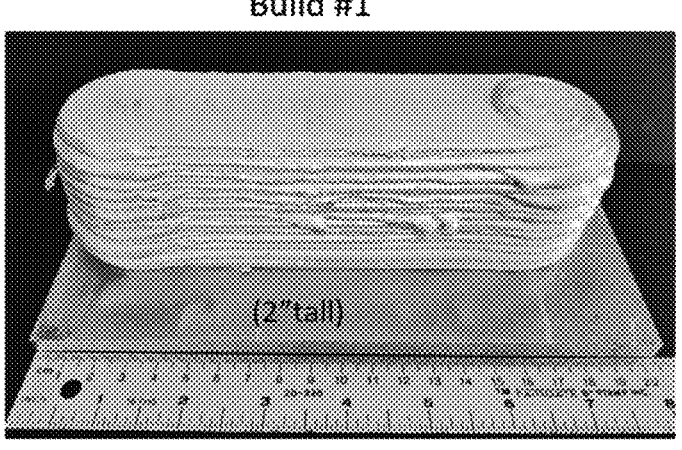
FIG. 32 is an illustration showing a 7075 aluminum alloy build using the tool of FIG. 30.
Figure 33:
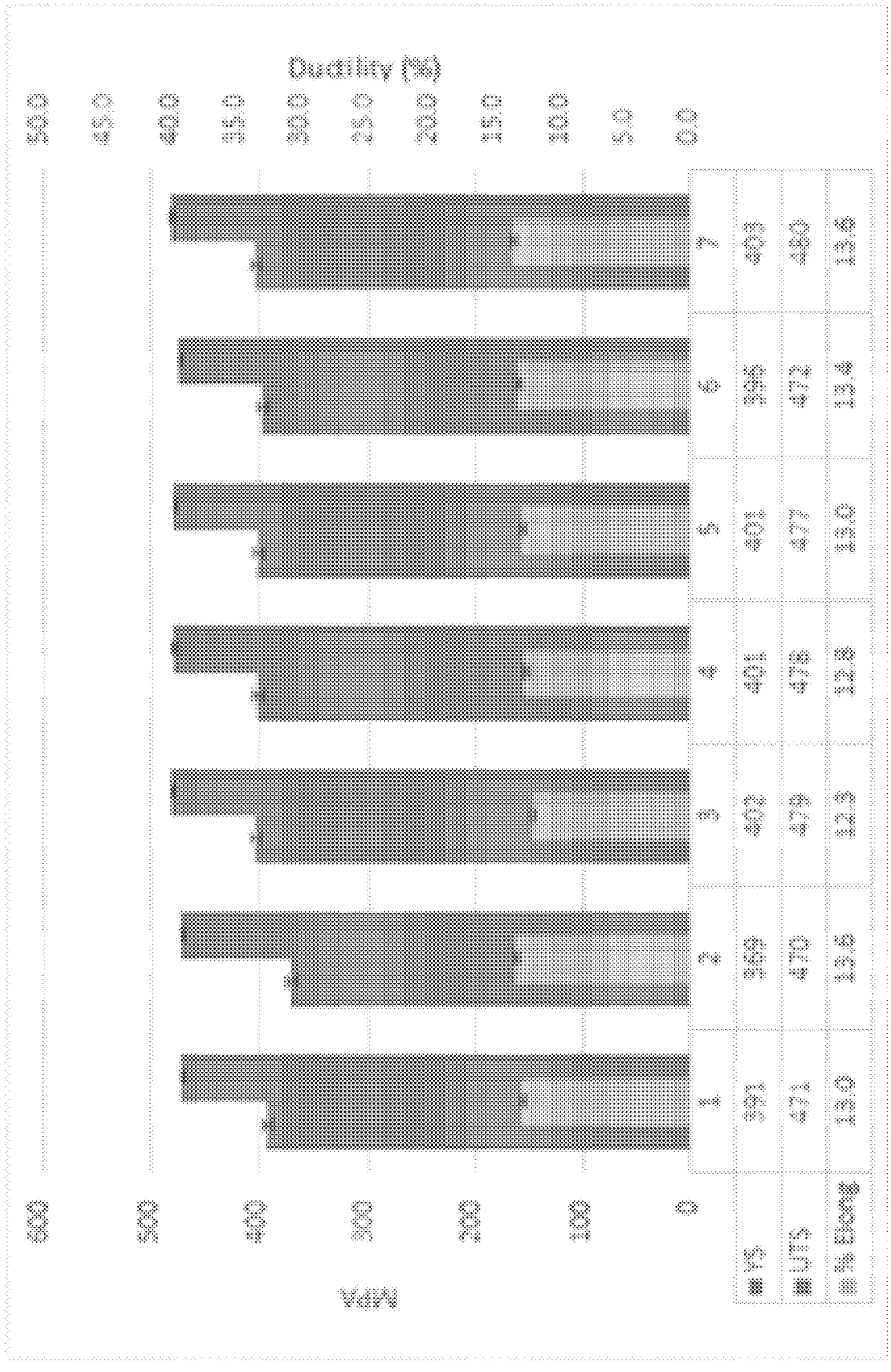
FIG. 33 is a graph showing test results of the build shown in FIG. 32.

The three member tool was used to deposit 7075 aluminum alloy onto a surface. FIG. 32 shows an image of the build on the surface. The tested properties of the deposited material are shown in FIG. 33. For comparison, for 7075-T73 forgings, the minima properties per AMS 4141 include: Ultimate Tensile Strength (UTS)=62 ksi; Tensile Yield Strength (YS)=53 ksi and Elongation=3%. The measured properties for all seven tested areas exceeded each of the minima values for UTS, YS and elongation for the forgings.

Example 2

Using the tooling shown in FIGS. 30 and 31, two parts were printed using 7075-T6511 0.5-inch extruded aluminum bar per extrusion standard ANSI H35.2. The printed parts were open boxes printed on 0.5-inch thick 7075-T7651 plate substrate using continuous feeding of the solid extruded aluminum bar material.

The first part was built with temperature control. The nominal deposition temperature for the first part was 335° C. (635° F.) for the first layer, then 350° C. (662° F.) for all subsequent layers.

The second part was also built with temperature control. The nominal deposition temperature for the second part was 350° C. (662° F.) for the first layer, then 345° C. (662° F.) for all subsequent layers. These temperatures were controlled via parameters such as spindle RPM (revolutions per minute), force, feed rate and traverse speed.

Figure 34:
FIG. 34 is a photograph showing a first produced part.
Figure 35:
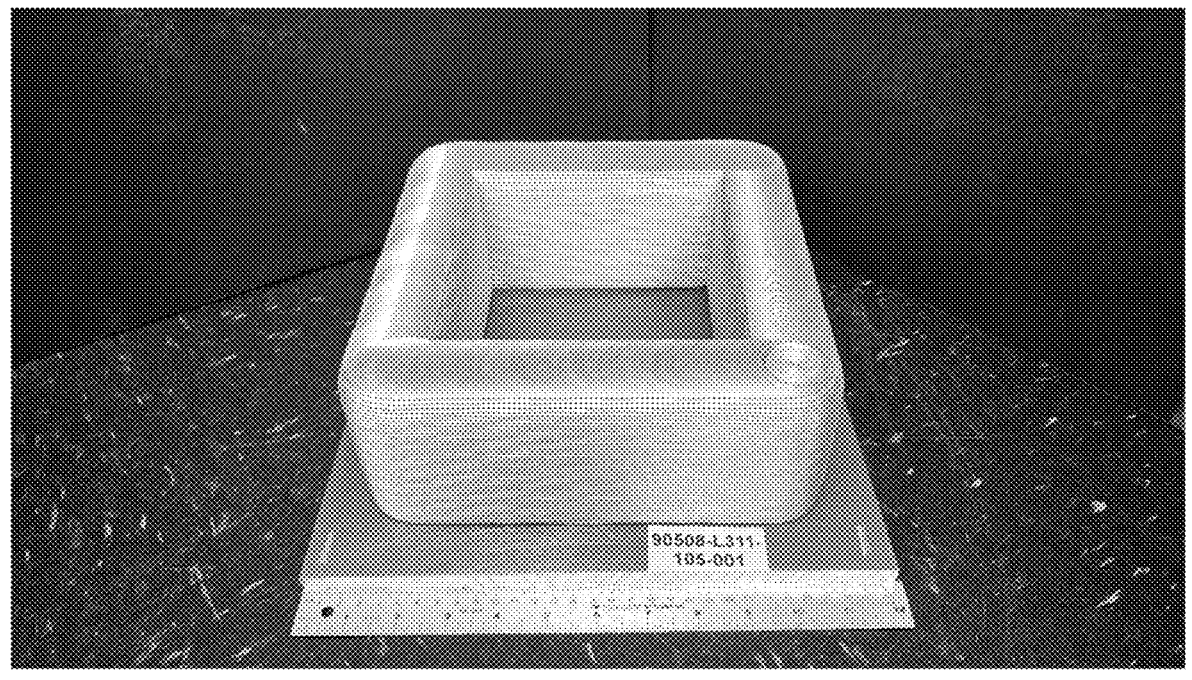
FIG. 35 is a photograph showing a second produced part.

For each part, the layer height during deposition was 0.080 inches except for the first layer which started with a machine Z-elevation of 0.055 inches. The builds were square boxes approximately 8 inches on each face, with walls approximately 1.75 inches wide, with the first part being 3.125 inches high and the second part being 3.75 inches high. FIG. 34 is a photograph showing the first part before machining and heat treatment to a –T73 temper, and FIG. 35 is a photograph showing the second part before machining and heat treatment to a –T73 temper.

Samples from the components were solution heat treated and artificially aged to the 7075-T73 temper using times and temperatures typical for forgings in the same temper as described in AMS 2770. The solution heat treatment process was 2 hours at 466° C. with a room temperature water quench. The artificial age process was 5 hours at 121° C. followed by a second step of 8 hours at 177° C. Both builds passed electrical conductivity and hardness criteria for 7075-T73 forgings.

Specimens were evaluated using standard NADCAP (aerospace standard) tests for tensile strength. All properties met minimum and/or typical performance requirements for 7075-T73 die forgings. Tensile tests conducted per ASTM E8 exceeded requirements for 7075-T73 die forgings; the specimens were tested in the Z-direction which is comparable to the short transverse direction of conventional forgings. Table 1 shows the results for the first part.

TABLE 1

| First Part | | | |
| --- | --- | --- | --- |
| | YS (MPa) | UTS (MPa) | % El |
| Average Measured Value | 425 | 477 | 11.6 |
| Minimum Measured Value | 420 | 441 | 3.0 |
| AMS 4141 7075-T73 Forging Minimum Values | 365 | 428 | 3.0 |

Z-elevation = distance between the substrate and the deposition tool surface
YS = Yield Strength
UTS = Ultimate Tensile Strength
% El = Elongation to failure or ductility
MPa = Mega Pascals Table 2 below shows the testing results for the second part.

TABLE 2

| Second Part | | | |
| --- | --- | --- | --- |
| | YS (MPa) | UTS (MPa) | % El |
| Average Measured Value | 427 | 485 | 12.1 |
| Minimum Measured Value | 420 | 479 | 5.7 |
| AMS 4141 7075-T73 Forging Minimum Values | 365 | 428 | 3.0 |

To ensure that the metal had good integrity and was fully bonded after solution heat treatment and quenching, both builds were inspected by ASTM B594 Standard Practice for Ultrasonic Inspection of Aluminum-Alloy Wrought Products. Both passed Class A criteria meaning no indications were detected that were 1.98 mm or larger and that such parts are considered appropriate for structural aerospace applications. Achieving this level of ultrasonic quality in an additively manufactured component is a significant achievement and actually exceeds requirements for many wrought aluminum alloys which are specified as Class B, meaning that they can have larger indications or discontinuities that are present in these components.

Parts produced using this tooling and process have many uses including, but not limited to aircraft components, forged parts for fuselage, wings, empennage and landing gear, helicopter components, land defense vehicles, pylons, wheels, trusses, cargo and luggage racks, longerons, wing and tail ribs, spars, wing skins, pressure bulkheads, engine surrounds, actuators, stiffeners, missile tubes, refueling booms, ordnance, launch vehicles and armor plate for military vehicles and structures.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A tool for depositing solid state feedstock material, the tool comprising:

a first tool member comprising a first inlet, a first outlet, and a first channel between the first inlet and the first outlet, wherein the first inlet is configured to receive the solid state feedstock material; and a second tool member comprising a second inlet, a second outlet, and a second channel between the second inlet and the second outlet, the second tool member configured to couple to the first tool member to permit the solid state feedstock material to be provided from the first tool member to the second tool member through the first channel and the first outlet of the first tool member and into the second inlet and the second channel of the second tool member, wherein the second channel of the second tool member comprises a draft angle at the second outlet of the second tool member to permit deposition of the solid state feedstock material from the second outlet onto a surface without using any lubricant on the solid state feedstock material, wherein the second tool member comprises a face at the second outlet that is configured to contact the surface during rotation of the tool to generate friction between the face and the contacted surface while applying force to the solid state feedstock material in the rotating tool to deform the solid state feedstock material exiting the second channel at the second outlet to deposit the exiting solid state feedstock material on the surface in a solid state without any lubricant on the exiting solid state feedstock material, wherein the first tool member reversibly couples to the second tool member, wherein the first outlet of the first tool member is coupled to the second inlet of the second tool member when the first tool member is reversibly coupled to the second tool member, and wherein the second tool member comprises at least one friction boss on the face of the second tool member.

2. The tool of claim 1, wherein the first tool member and the second tool member each comprises a material with a thermal conductivity of at least 125 W/m-K.

3. The tool of claim 1, wherein the first tool member and the second tool member comprises at least one material that is the same.

4. The tool of claim 1, wherein the first tool member comprises a material that is different than a material of the second tool member.

5. The tool of claim 1, further comprising a gasket between the first tool member and the second tool member, wherein the gasket is configured to provide a thermal break between the first tool member and the second tool member.

6. The tool of claim 1, wherein a cross sectional shape of the second channel is symmetrical.

7. The tool of claim 1, wherein a cross sectional shape of the second channel is asymmetrical.

8. The tool of claim 1, wherein a cross-sectional shape of the first channel of the first tool member and a cross-sectional shape of the second channel of the second tool member are the same.

9. The tool of claim 1, wherein a cross-sectional shape of at least a portion of the first channel of the first tool member and a cross-sectional shape of the second channel of the second tool member are different.

10. The tool of claim 1, wherein a diameter of the second channel at the second outlet of the second tool member is greater than a diameter of the first channel at the first outlet of the first tool member.

11. The tool of claim 1, wherein a diameter of the second channel at the second outlet of the second tool member is greater than a diameter of the second channel at the second inlet of the second tool member.

12. The tool of claim 1, wherein at least one of the first tool member and the second tool member comprises an internal channel.

13. The tool of claim 1, wherein the second tool member comprises at least two friction bosses each configured to generate friction between the face of the second member and the surface during rotation of the tool.

14. A tool for depositing solid state feedstock material, the tool comprising:

a first tool member comprising a first inlet, a first outlet, and a first channel between the first inlet and the first outlet, wherein the first inlet is configured to receive the solid state feedstock material; and a second tool member comprising a second inlet, a second outlet, and a second channel between the second inlet and the second outlet, the second tool member configured to couple to the first tool member to permit the solid state feedstock material to be provided from the first tool member to the second tool member through the first channel and the first outlet of the first tool member and into the second inlet and the second channel of the second tool member, wherein the second channel of the second tool member comprises a draft angle at the second outlet of the second tool member to permit deposition of the solid state feedstock material from the second outlet onto a surface without using any lubricant on the solid state feedstock material, wherein the second tool member comprises a face at the second outlet that is configured to contact the surface during rotation of the tool to generate friction between the face and the contacted surface while applying force to the solid state feedstock material in the rotating tool to deform the solid state feedstock material exiting the second channel at the second outlet to deposit the exiting solid state feedstock material on the surface in a solid state without any lubricant on the exiting solid state feedstock material, wherein the first outlet of the first tool member slidingly engages the second inlet of the second tool member when the first tool member is reversibly coupled to the second tool member.

15. The tool of claim 14, wherein the second tool member slidingly engages the first tool member through an opening at the first outlet.

16. The tool of claim 1, wherein each of the first tool member and the second tool member comprises apertures configured to receive a mechanical fastener to couple the first tool member to the second tool member.

17. The tool of claim 1, wherein an outer diameter of the first inlet is smaller than an outer diameter of the first outlet, and wherein an outer diameter of the second inlet is smaller than an outer diameter of the second outlet.

18. A tool for depositing solid state feedstock material, the tool comprising, a first tool member comprising a first inlet, a first outlet, and a first channel between the first inlet and the first outlet, wherein the first inlet is configured to receive the solid state feedstock material;

a second tool member comprising a second inlet, a second outlet, and a second channel between the second inlet and the second outlet, the second tool member configured to reversibly couple to the first tool member to permit the solid state feedstock material to be provided from the first tool member to the second tool member through the first channel and the first outlet of the first tool member and into the second inlet and the second channel of the second tool member, wherein the second channel of the second tool member comprises a draft angle at the second outlet of the second tool member to permit deposition of the solid state feedstock material from the second outlet onto a surface without using any lubricant on the solid state feedstock material, wherein the second tool member comprises a face at the second outlet that is configured to contact the surface during rotation of the tool to generate friction between the face and the contacted surface while applying force to the solid state feedstock material in the rotating tool to deform the solid state feedstock material exiting the second channel at the second outlet to deposit the exiting solid state feedstock material on the surface in a solid state without any lubricant on the exiting solid state feedstock material; and a third tool member comprising a third inlet, a third outlet, and a third channel between the third inlet and the third outlet, wherein the third tool member is configured to reversibly couple to the first tool member at the first inlet end of the first tool member to permit solid state feedstock material in the third channel to be provided into the first inlet and into the first channel of the first tool member.

19. The tool of claim 18, wherein the second tool member comprises at least one friction boss on the face of the second tool member.

20. The tool of claim 18, wherein the second tool member comprises two tear dropped shaped friction bosses on the face of the second tool member.

\* \* \* \* \*